US012368992B2

(12) United States Patent
Lee et al.

(10) Patent No.: US 12,368,992 B2
(45) Date of Patent: Jul. 22, 2025

(54) DISPLAY DEVICE FOR FRONT EMISSION OF AUDIO

(71) Applicant: SAMSUNG ELECTRONICS CO., LTD., Suwon-si (KR)

(72) Inventors: Jaeneung Lee, Suwon-si (KR); Dongwook Kim, Suwon-si (KR); Chulyong Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 367 days.

(21) Appl. No.: 17/948,610

(22) Filed: Sep. 20, 2022

(65) Prior Publication Data

US 2023/0171537 A1   Jun. 1, 2023

Related U.S. Application Data

(63) Continuation of application No. PCT/KR2022/013582, filed on Sep. 8, 2022.

(30) Foreign Application Priority Data

Nov. 30, 2021 (KR) .................. 10-2021-0169047

(51) Int. Cl.
  *H04R 1/34* (2006.01)
  *H04R 1/02* (2006.01)
  *H04R 1/28* (2006.01)
(52) U.S. Cl.
  CPC .......... *H04R 1/2857* (2013.01); *H04R 1/025* (2013.01); *H04R 1/028* (2013.01); *H04R 2499/15* (2013.01)

(58) Field of Classification Search
  CPC ............ H04R 1/2857; H04R 2201/025; H04R 2499/15
  See application file for complete search history.

(56) References Cited

U.S. PATENT DOCUMENTS

| 9,888,595 | B2 | 2/2018 | Min et al. |
| 10,656,672 | B2 | 5/2020 | Youn et al. |
| 10,963,078 | B2 | 3/2021 | Lee et al. |

(Continued)

FOREIGN PATENT DOCUMENTS

| CN | 207166638 U | 3/2018 |
| JP | 3411784 | 6/2003 |

(Continued)

OTHER PUBLICATIONS

International Search Report dated Dec. 21, 2022 in International Patent Application No. PCT/KR2022/013582.

(Continued)

*Primary Examiner* — Ryan Robinson
(74) *Attorney, Agent, or Firm* — STAAS & HALSEY LLP

(57) ABSTRACT

A display device includes a display panel; a housing comprising a first frame including a plate to support the display panel and a second frame formed to extend from one periphery of the first frame along a direction toward which a display area of the display panel faces; a speaker module including at least one speaker and disposed in the second frame; and a circuit board on the second frame and to be operatively connected to the display panel and the speaker. The second frame includes a slit on an outer surface of the second frame that faces the direction along which the second frame extends.

20 Claims, 15 Drawing Sheets

(56) References Cited

U.S. PATENT DOCUMENTS

| | | | | |
|---|---|---|---|---|
| 2006/0280329 | A1* | 12/2006 | Soga | H04R 1/025 |
| | | | | 381/388 |
| 2009/0080681 | A1 | 3/2009 | Hamada et al. | |
| 2014/0044300 | A1* | 2/2014 | Osada | H04R 1/02 |
| | | | | 381/387 |
| 2015/0117686 | A1* | 4/2015 | Kim | H04R 1/403 |
| | | | | 381/306 |
| 2017/0026726 | A1* | 1/2017 | Kim | H04R 9/06 |
| 2021/0200264 | A1* | 7/2021 | Kim | H04S 1/007 |
| 2022/0046345 | A1* | 2/2022 | Mai | H04R 1/02 |
| 2022/0174445 | A1 | 6/2022 | So et al. | |
| 2022/0240007 | A1* | 7/2022 | Hagio | G10K 11/20 |
| 2023/0379618 | A1* | 11/2023 | Andersen | H04R 1/028 |
| 2024/0015426 | A1* | 1/2024 | Ikuma | H04R 5/02 |

FOREIGN PATENT DOCUMENTS

| | | |
|---|---|---|
| JP | 5034756 B2 | 7/2012 |
| KR | 10-2557576 | 7/2003 |
| KR | 10-2008-0063681 | 7/2008 |
| KR | 10-2011-0055345 A | 5/2011 |
| KR | 10-2011-0058578 | 6/2011 |
| KR | 10-2014-0121525 A | 10/2014 |
| KR | 10-1631275 | 6/2016 |
| KR | 10-1631275 B1 | 6/2016 |
| KR | 10-2018-0095750 A | 8/2018 |
| KR | 10-1903398 | 10/2018 |
| KR | 10-2019-0021523 A | 3/2019 |
| KR | 10-2019-0068877 | 6/2019 |
| KR | 30-0984892 S | 6/2019 |
| KR | 10-2019-0090633 | 8/2019 |
| KR | 10-2312879 | 10/2021 |
| KR | 10-2395490 | 5/2022 |
| KR | 10-2463639 | 11/2022 |
| WO | WO-2020141832 A1 * | 7/2020 ............ H04R 1/025 |
| WO | WO-2020213375 A1 * | 10/2020 ............ H04R 3/04 |
| WO | WO 2020/225993 A1 | 11/2020 |

OTHER PUBLICATIONS

PCT/ISA/237 dated Dec. 21, 2022 in International Patent Application No. PCT/KR2022/013582
Richard Bone and Jisu Yun design transparent OLED television that can be used as a shelf | Dezeen, https://www.youtube.com/watch?v=DWwoyRrsiaY, May 25, 2021.
Extended European Search Report issued Dec. 11, 2024 for European Patent Application No. 22901518.5.

* cited by examiner

DISPLAY DEVICE FOR FRONT EMISSION OF AUDIO

CROSS-REFERENCE TO RELATED APPLICATIONS

This application is a continuation application, under 35 U.S.C. § 111(a), of International Patent Application No. PCT/KR2022/013582, filed on Sep. 8, 2022, which based on and claims benefit of priority under 35 U.S.C. § 119 to Korean Patent Applications No. 10-2021-0169047, filed on Nov. 30, 2021, in the Korean Intellectual Property Office, the disclosures of which are incorporated by reference herein in their entireties.

BACKGROUND

Field

The present disclosure relates to a display device for front emission of audio.

Description of the Related Art

A display device may include a display panel to provide visual information to a user. Visual information that may be viewed by a user may be displayed in the display area of the display panel. A user of the display device may view visual information displayed on the display area in a direction toward which the display area faces.

The display device may include a speaker module to provide audio along with visual information to the user. The user may be provided with audio through the speaker module.

The display device may be disposed at a specific location for viewing by the user. For example, the display device may be installed on a wall, a ceiling, or a pillar, and may be disposed on the ground or a table.

SUMMARY

According to an embodiment, a display device may comprise a display panel; a housing including a first frame comprising a plate to support the display panel and a second frame integrally formed with the first frame, the second frame being formed to extend from one periphery of the first frame along a direction toward which the display area of the display panel faces; a speaker module including at least one speaker and disposed in the second frame; and a circuit board on the second frame and to be operatively connected to the display panel and the speaker; wherein the second frame may comprise a slit on an outer surface of the second frame that faces the direction along which the second frame is formed to extend to allow audio emitted from the speaker to be transmitted along the direction toward which the display area faces. In addition, various embodiments may be possible.

According to an embodiment, a display device may comprise a display panel; a housing including a first frame comprising a plate to support the display panel and a second frame integrally formed with the first frame, the second frame being formed to extend from one periphery of the first frame along a direction toward which the display area of the display panel faces; a speaker module including at least one speaker and disposed in the second frame; a posture detection sensor within the housing that identifies a posture of the housing; and one or more processors within the second frame that changes visual information provided through the display area based on a signal obtained from the posture detection sensor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
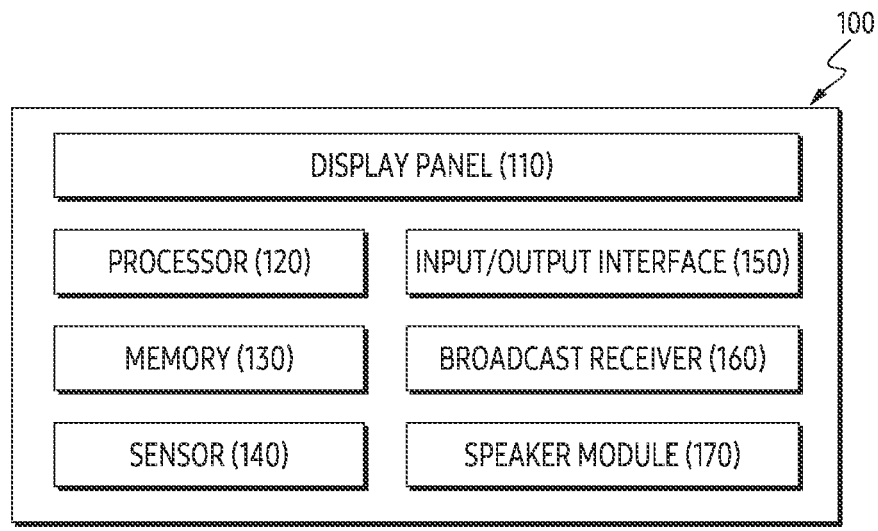
FIG. 1 is a block diagram of a display device according to an embodiment.

Herein below, various embodiments of the disclosure are described with reference to drawings. Reference is made in detail to embodiments, examples of which are illustrated in the accompanying drawings. In this regard, the embodiments may have different forms and should not be construed as being limited to the descriptions set forth herein. In order to further clearly describe features of the embodiments, descriptions of other features that are well known to one of ordinary skill in the art are omitted here.

As consumers' interest in the aesthetic design of the display device increases, a design in which the speaker module is disposed inside the display device is being adopted. The speaker module disposed inside the display device may have a structure that emits audio toward the top and bottom of the display device rather than the direction the display panel faces.

The audio emitted toward the top and bottom of the display device may be degraded or distorted in sound quality depending on the structure of the indoor space in which the display device is disposed. For example, when audio is emitted toward the top of the display device, the audio may be reflected from the ceiling and then transmitted to the user, thereby reducing the resolution of the audio.

Due to characteristics of the display device disposed in an indoor space, preference for a specific posture of the display device may be different. For example, a stand-up display device may be preferred in a large space, and a wall-mounted display device may be preferred in a narrow space. When changing the posture is impossible when the display device is moved from one space to another, it may cause inconvenience to the user.

Various embodiments of the present disclosure may provide a display device capable of transmitting clear and high-resolution audio and freely changing posture.

The technical problems to be achieved in this document are not limited to those described above, and other technical problems not mentioned herein will be clearly understood by those having ordinary knowledge in the art to which the present disclosure belongs, from the following description.

The display device according to an embodiment can provide clear and high-resolution audio to the user through a structure capable of directly transmitting audio to the user.

The display device according to an embodiment can change a posture, and may provide substantially the same visual signal and substantially the same audio depending on the change of the posture. The display device can secure an indoor space by selecting a free posture according to the indoor space in which the display device is installed and the user's preference.

In the display device according to an embodiment, since a circuit board for driving the display device is disposed close to the display driver integrated circuit, it can be easy to design for electrical connection between the circuit board and the display driver integrated circuit.

The effects that can be obtained from the present disclosure are not limited to those described above, and any other effects not mentioned herein will be clearly understood by those having ordinary knowledge in the art to which the present disclosure belongs, from the following description.

FIG. 1 is a block diagram of a display device according to an embodiment.

Referring to FIG. 1, according to an embodiment, the display device 100 may include a display panel 110, one or more processors 120, a memory 130, a sensor 140, an input/output interface 150, a broadcast receiver 160, and a speaker module 170.

According to an embodiment, the display device 100 may be implemented as various devices capable of playing image content by including a display such as, for example, a smart TV, a tablet, a monitor, a smart phone, a desktop computer, a laptop computer, a navigation, and a digital signage. According to an embodiment, the display device 100 may further include various other configurations required for the operation of the implemented device in addition to the configuration illustrated in FIG. 1, according to the implementation example.

According to an embodiment, the display panel 110 may display visual information (e.g., multimedia data or text data) to a user. The display panel 110 may include a display area for displaying visual information. According to an embodiment, the display panel 110 may have various configurations and structures capable of implementing an image. For example, the display panel 110 may include a plurality of pixels, and each pixel may include a plurality of sub-pixels. For example, each pixel may include three sub-pixels corresponding to a plurality of light, for example, red, green, and blue (R, G, and B) light. For another example, the pixel may include a first sub-pixel providing red light, a second sub-pixel providing blue light, a third sub-pixel providing green light, and a fourth sub-pixel. However, the present invention is not limited thereto, and in some cases, Cyan, Magenta, Yellow, Black, or other sub-pixels may be included in addition to the red, green, and blue sub-pixels. According to an embodiment, the display panel 110 may be a liquid crystal display (LCD), a plasma display panel (PDP), an organic light emitting display (OLED), an electric field emission display (FED), or white organic light emitting display (WOLED). According to an embodiment, the display panel 110 may be planar or curved.

According to an embodiment, the one or more processors 120, by executing software, may control at least one other component (e.g., hardware or software component) of the display device 100 connected to the one or more processors 120, and perform various data processing or operations. According to an embodiment, as at least part of data processing or operation, the one or more processors 120 may store commands or data received from other components (e.g., sensors 140) in the volatile memory, process commands or data stored in the volatile memory, and store the result data in the non-volatile memory. According to an embodiment, the one or more processors 120 may control the overall operation of the display device 100. According to an embodiment, the one or more processors 120 may be implemented as a digital signal processor (DSP), a microprocessor, and a time controller (TCON). However, the present invention is not limited thereto, and may include at least one of a central processing unit (CPU), a micro controller unit (MCU), a micro processing unit (MPU), a controller, an application processor (AP), a graphics-processing unit (GPU), or a communication processor (CP) and an ARM processor, or may be defined by a corresponding term. In addition, the one or more processors 120 may be implemented as a system on chip (SoC) or a large scale integration (LSI) in which a processing algorithm is embedded, or may be implemented in the form of a field programmable gate array (FPGA).

According to an embodiment, the memory 130 may store various data used by at least one component (e.g., the one or more processors 120 or the sensor 140) of the display device 100. The data may include, for example, input data or output data for software and related commands. According to an embodiment, the memory 130 may store data for driving the display device 100, an application, an operating system (O/S), and/or an algorithm. The memory 130 may store various information such as various data input, set, or generated during execution of a program or application. The one or more processors 120 may perform various functions by executing computer executable instructions stored in the memory 130. The memory 130 may include a volatile memory or a non-volatile memory.

According to an embodiment, the input/output interface 150 may transmit a command or data input from a user to the one or more processors 120 and/or the memory 130. According to an embodiment, the input/output interface 150 may be provided to be connectable to another device separately provided from the display device 100, for example, an external storage device. For example, the input/output interface 150 may be a universal serial bus (USB) terminal, and in addition, may include at least one of various interface terminals such as a high definition multimedia interface (HDMI) terminal or a Thunderbolt terminal.

According to an embodiment, the broadcast receiver 160 may receive a broadcast signal from a broadcast station or a satellite by wire or wirelessly. For example, the broadcast receiver 160 may receive and demodulate a transmission stream through an antenna or a cable to output a digital transmission stream signal. In the display device 100 according to an embodiment, the broadcast receiver 160 may be omitted.

According to an embodiment, the speaker module 170, by converting into sound, may output an audio signal received from the outside and/or an audio signal (e.g., a notification sound, a voice message) generated by the display device 100. According to an embodiment, the speaker module 170 may include at least one speaker. The speaker module 170 may output a stereophonic sound by each audio signal corresponding to each speaker. For example, speaker module 170 includes a first speaker (e.g., a first speaker 231 of FIG. 7) and a second speaker (e.g., a second speaker 231 of FIG. 7) spaced apart from display device 100, and each speaker may provide a three-dimensional sound to a user by outputting different audio signals.

Figure 2:
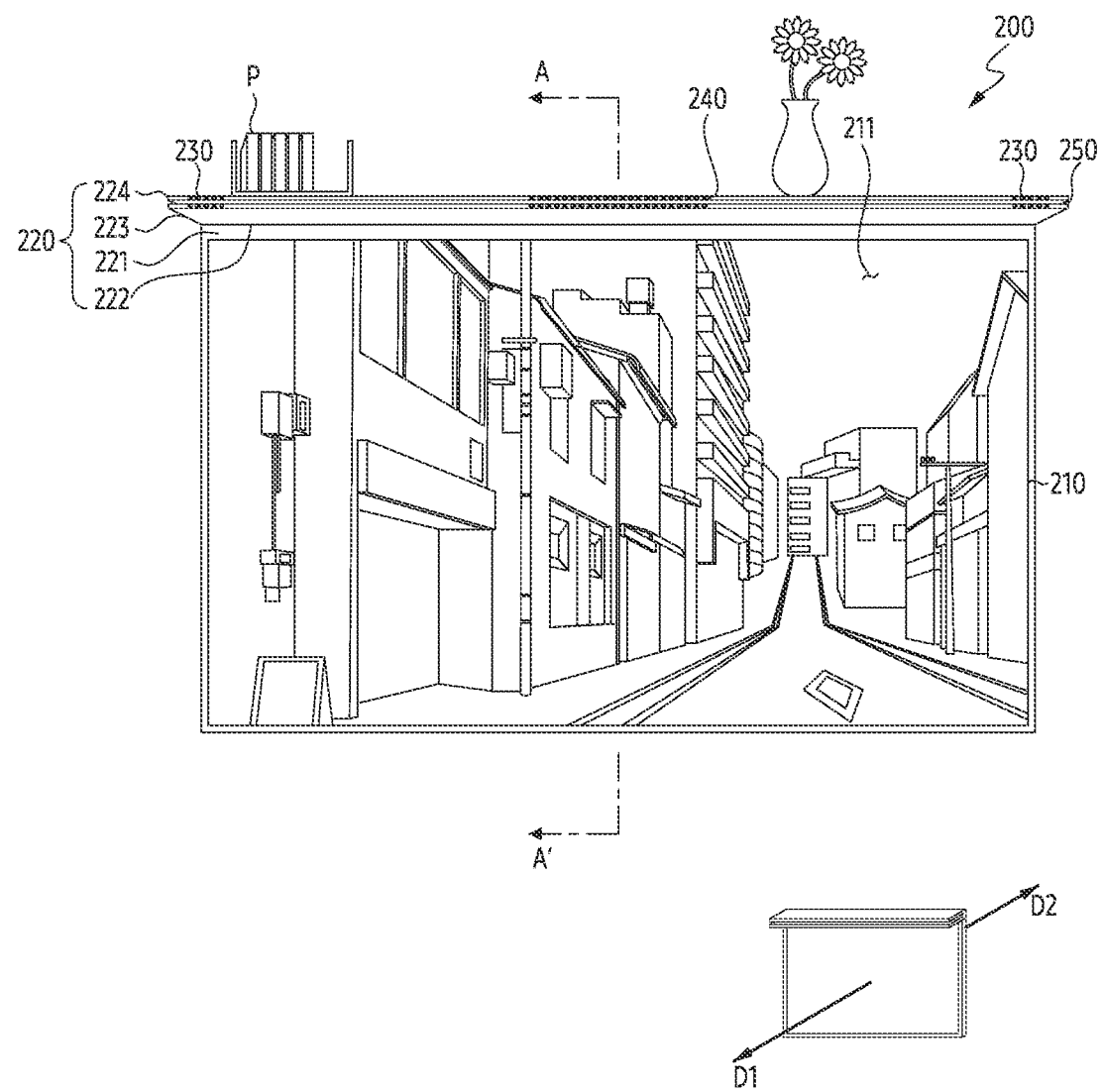
FIG. 2 illustrates a first state of a display device according to an embodiment.

FIG. 2 illustrates a first state of a display device according to an embodiment.

Referring to FIG. 2, according to an embodiment, a display device 200 may include a display panel 210 that provides visual information to a user, a housing 220 including a first frame 221 and a second frame 223, and a speaker module 230 that provides audio to a user by outputting an audio signal, a circuit board 240 for controlling the display device 200 and supplying power to the display device 200 and a slit 250 disposed in a second frame 223.

According to an embodiment, the display panel 210 may include a display area 211 that displays visual information. The display panel 210 may provide visual information to a user through the display area 211. For example, the display panel 210 may provide an image signal provided from the broadcast receiver to the user through the display area 211. According to an embodiment, the display area 211 of the display panel 210 may be divided at a predetermined ratio according to a user's setting. The display panel 210 may include a plurality of pixels. A pixel may mean a minimum unit composing an image when the image is visually displayed through light emitted from a light source of the display panel 210.

According to an embodiment, the housing 220 may include a first frame 221 and a second frame 223. According to an embodiment, the first frame 221 may include a plate supporting one surface of the display panel 210. The first frame 221 may correspond to the shape of the display panel 210. For example, when the display panel 210 is planar, an area of the first frame 221 that supports the display panel 210 may be a planar plate. For another example, when the display panel 210 has a curved shape, at least a part of the first frame 221 that supports the display panel 210 may be bent to correspond to the shape of the display panel 210.

According to an embodiment, the second frame 223 may be integrally formed with the first frame 221. The fact that the first frame 221 and the second frame 223 are integrally formed may mean a structure in which the first frame 221 and the second frame 223 are directly connected, without a separate connecting member connecting the first frame 221 and the second frame 223. For example, the housing 220 may include a bent second frame 223 at one periphery 222 of the first frame 221. According to an embodiment, the second frame 223 may extend from one periphery 222 of the first frame 221 in a direction D1 in which the display area 211 of the display panel 210 faces. The direction D1 in which the display area 211 of the display panel 210 faces may refer to an emission direction of light emitted from the display panel 210. For example, the direction D1 in which the display area 211 faces may be a direction toward a user who views visual information displayed on the display area 211 of the display panel 210. The user may view visual information provided in the direction D1 in which the display area 211 of the display panel 210 faces.

According to an embodiment, the display device 200 may be capable of changing the posture of the housing 220. According to an embodiment, the posture of the housing 220 may include a first state and a second state that may be distinguished according to a position of the second frame 223 with respect to the first frame 221. According to an embodiment, the first state of the display device 200 may mean a state in which the second frame 223 is positioned above the first frame 221. The first state may be distinguished from the second state to be described later. According to an embodiment, the display device 200 may be installed on an external object in the first state. For example, the display device 200 may be used as a wall-hanging display device 200 installed on a wall, ceiling, or pillar in the first state. For example, at least a part of the first frame 221 may be in contact with the wall, and the second frame 223 may protrude from the wall contacting the first frame 221 in a direction D1 in which the display area 211 of the display panel 210 faces. Since the second frame 223 protrudes in the direction D1 in which the display area 211 faces, the second frame 223 may protrude in a direction opposite to a position of an external object (e.g., a wall) in which the display device 200 is installed. Since the second frame 223 extends in the direction D1 in which the display area 211 of the display panel 210 faces, it may be used as a shelf or a storage space for placing the object P. For example, a remote controller, a book, an ornament, and a set-top box may be placed on the second frame 223. In the first state, the display device 200 may be installed on a wall, a ceiling, or a pillar, thereby minimizing an occupied space, and easily adjusting the position of the display area 211.

According to an embodiment, the second frame 223 may accommodate the speaker module 230, the circuit board 240, and the slit 250. According to an embodiment, the speaker module 230 may provide audio to a user by outputting an audio signal within the second frame 223. The speaker module 230 may include a plurality of speakers that output different audio signals. According to an embodiment, the circuit board 240 may control driving of the display panel 210. The circuit board 240 may include an integrated circuit (e.g., a power management integrated circuit (PMIC)) that supplies power to the display panel 210.

According to an embodiment, the slit 250 may transmit audio emitted from the speaker module 230 in a direction D1 in which the display area 211 faces. When the audio emitted from the speaker module 230 is transmitted in a direction other than the direction D1 in which the display area 211 faces, distortion of the audio provided to the user or degradation in sound quality may be caused. For example, when the audio emitted from the speaker module 230 is transmitted downward from the housing 220, the audio may be reflected on the ground and then transmitted to the user, thereby degrading the resolution of the audio. When the audio emitted from the speaker module 230 is transmitted in a direction in which the display area 211 faces, the audio may be transmitted to the user of the display device 200 without distortion of audio or degradation of sound quality.

According to an embodiment, the slit 250 may be disposed on the front surface 224 of the second frame 223 facing the direction D1 in which the second frame 223 extends among the outer surfaces of the second frame 223. The slit 250 may provide a transmission path of audio emitted from the speaker module 230 by penetrating from the front surface 224 of the second frame 223 facing the direction D1 in which the second frame 223 extends to the speaker module 230. The audio emitted from the speaker module 230 may be transmitted in a direction D1 in which the display area 211 faces by being transmitted to the front surface 224 of the second frame 223 through the slit 250. According to an embodiment, since the audio emitted from the speaker module 230 in the second frame 223 may be transmitted to the user through the slit 250, the display device 200 may transmit the audio in a direction D1 in which the display area 211 faces. According to an embodiment, the display device 200 may directly transmit audio emitted from the speaker module 230 to a user who views visual information displayed on the display area 211 of the display panel 210 through the slit 250. According to an embodiment, the display device 200 may provide high-quality audio to the user with clear and high resolution by directly transmitting the audio to the user.

In the case of a display device having a structure in which the first frame and the second frame form the same plane, the speaker module may face upward or downward of the display device. The speaker module of the display device having a structure in which the first frame and the second frame form the same plane may transmit audio upward or downward of the display device. In the case of the above-described display device disposed in an indoor space, since the audio emitted upward or downward is transmitted to the user after being reflected on the ceiling, wall or floor, the audio may be distorted, or the sound quality of the audio may be degraded.

According to an embodiment, the display device 200 may transmit audio emitted from the speaker module 230 disposed in the second frame 223 in a direction D1 in which the display area 211 of the display panel 210 faces. The user may listen to audio provided from the speaker module 230 in a direction D1 in which the display area 211 of the display panel 210 faces. According to an embodiment, the display device 200 may provide clear and high-quality audio to a user.

The first frame 221 and the second frame 223 may be integrally formed through a hinge, and thus may be formed to be rotatable with each other. The second frame 223 may be rotatably connected to the first frame 221, thereby adjusting the position of the second frame 223. For example, the second frame 223 may form a first shape of the housing 220 positioned to extend in a direction D1 in which the display area 211 of the display panel 210 faces with respect to the first frame 221. The second frame 223 may rotate by 90 degrees from the first shape to form a second shape of the housing 220 positioned to form substantially the same plane as the first frame 221. The second frame 223 may rotate by 90 degrees from the second shape to form a third shape of the housing 220 positioned to extend in a direction D2 opposite to the direction D1 in which the display area 211 of the display panel 210 faces, with respect to the first frame 221. The user may change the first shape, the second shape, and the third shape of the housing by adjusting the position of the second frame 223 with respect to the first frame 221.

Figure 3:
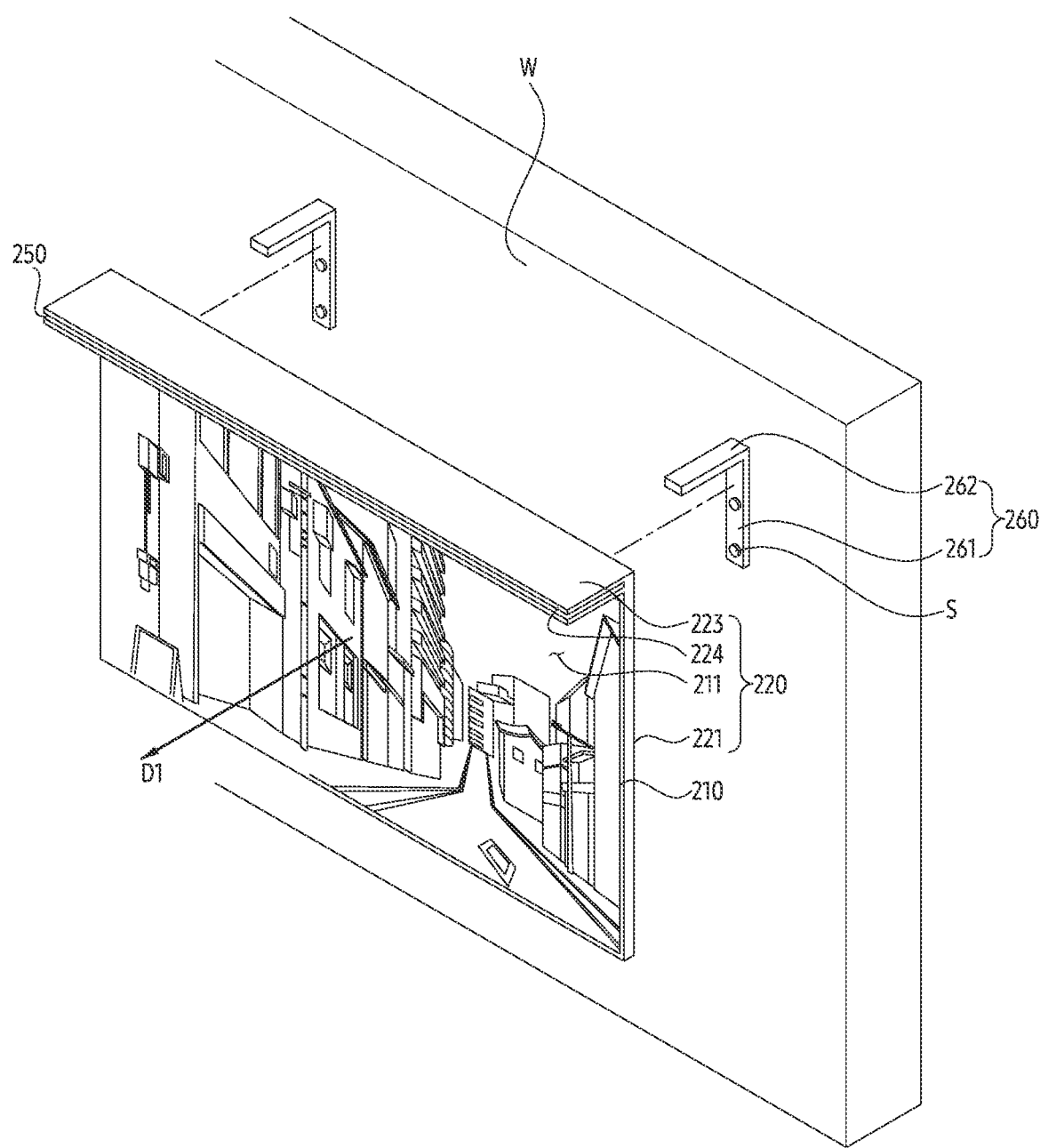
FIG. 3 illustrates a first state of a display device and a support according to an embodiment.

FIG. 3 illustrates a first state of a display device and a support according to an embodiment.

Referring to FIG. 3, the display device 200 according to an embodiment may include a support 260 supporting the housing 220. According to an embodiment, the support 260 may include a first body 261 attached to the first frame 221 and a second body 262 extending along the second frame 223 in the first state of the housing 220. A part of the support 260 may be fixed to an external object. For example, when the housing 220 is in the first state, the support 260 may be a wall mount bracket in which one surface of the first body 261 is connected to the housing 220 and the other surface facing one surface of the first body 261 is fixed to the wall W.

According to an embodiment, in the first state, the display device 200 may be installed on an external object (e.g., a wall (W), a pillar, and a ceiling). When the display device 200 is in the first state, the second frame 223 of the housing 220 may be positioned above the first frame 221.

According to an embodiment, when the display device 200 is in the first state, the first body 261 may be fixed to an external object and attached to the first frame 221. The first frame 221 may be connected to the first body 261 in various fastening methods such as screw coupling, hook coupling, and forced fitting. The first frame 221 may be attached to the first body 261 through an adhesive member. For example, the first body 261 may be fixed to the wall W by a screw S inserted into the wall W pass through the first body 261. The first frame 221 may include a groove on a surface facing the surface on which the display panel 210 is disposed. The groove may accommodate a protruding portion of the screw S inserted into the wall W. In a state in which the support 260 is fixed to the wall W by the screw S, the display device 200 may be installed on the wall W by inserting the protruding portion of the screw S into the groove of the first frame 22. For another example, the screw S may be inserted into the wall W by passing through the first body 261 from a portion of the first frame 221 that does not overlap the display panel 210. The second body 262 extending along the second frame 223 may be positioned above the second frame 223. In order to firmly fix the display device 200, the second frame 223 and the second body 262 may be fastened to each other. According to an embodiment, the second frame 223 may be attached to the second body 263 through an adhesive member. According to an embodiment, the support 260 may include a material having excellent rigidity to support a load of objects mounted on the housing 220, the display panel 210, and the second frame 223. For example, the support 260 may include a metal alloy having excellent rigidity and durability.

Figure 4:
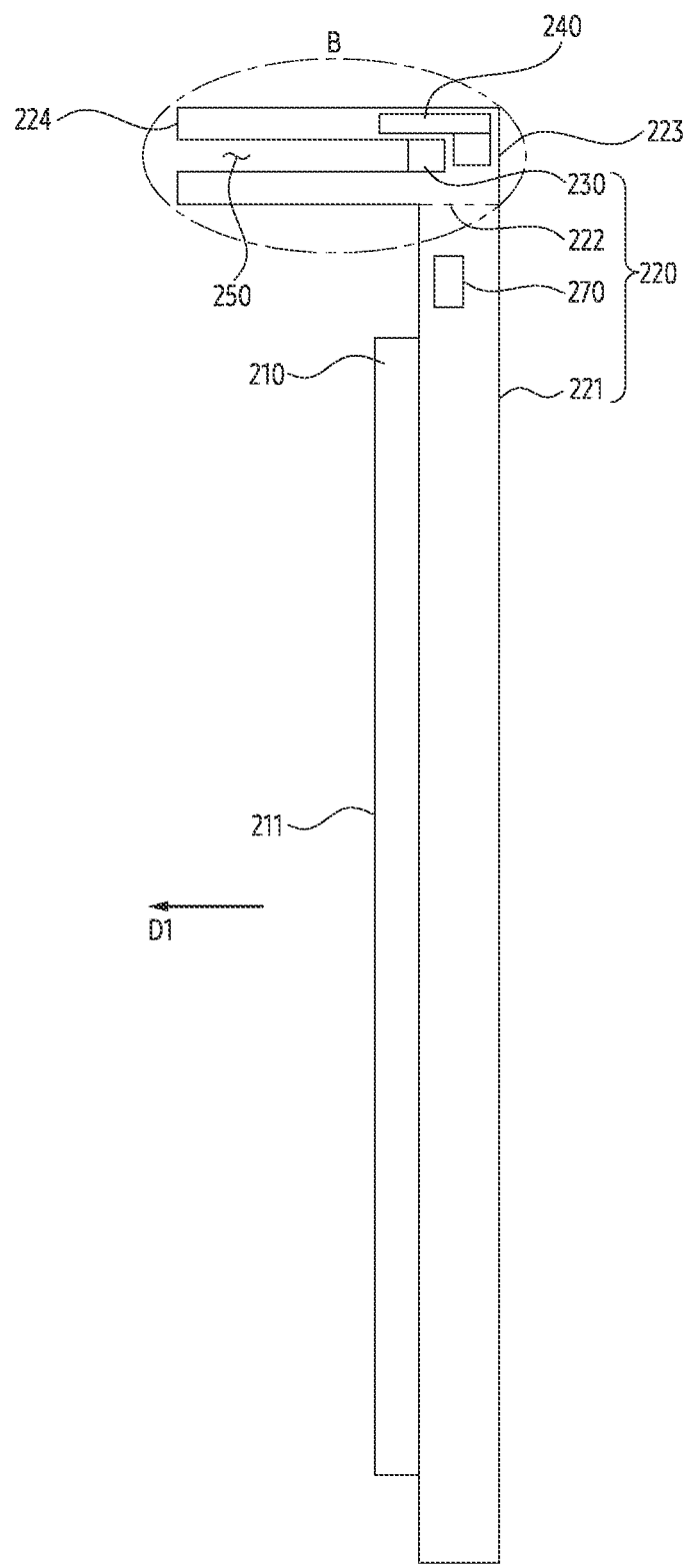
FIG. 4 is a cross-section view of a display device cut along A-A' of FIG. 2, according to an embodiment.

FIG. 4 is a cross-section view of a display device cut along A-A' of FIG. 2, according to an embodiment.

Referring to FIG. 4, in the display device 200 according to an embodiment, the speaker module 230 and the circuit board 240 may be disposed in the second frame 223. According to an embodiment, the speaker module 230 may be disposed in the slit 250 to transmit audio in the direction D1 in which the display area 211 faces. For example, the speaker module 230 may be disposed to emit audio toward the front surface 224 of the second frame 223 within the slit 250. For another example, the slit 250 may extend from the front surface 224 of the second frame 223 to the speaker module 230.

According to an embodiment, the display device 200 may include a display driver integrated circuit 270 (DDI) for driving the display panel 210. When receiving a control signal from the circuit board 240, the display driver integrated circuit 270 may control the display panel 210 in response to reception of the signal. For example, the circuit board 240 may transmit a control signal to the display driver integrated circuit 270 when a control command of the display device 200 is obtained from a user through a remote control and the display driver integrated circuit 270 may control an operation of a pixel through a thin film transistor (TFT) of the display panel 210 in response to reception of the control signal. The display driver integrated circuit 270 may include a Gate IC for controlling on/off of subpixels and a Source IC for controlling visual information expressed by sub-pixels. A plurality of display driver integrated circuits 270 may be provided according to the resolution of the display device 200.

According to an embodiment, the display driver integrated circuit 270 may be disposed at a periphery of the display panel 210 to control pixels composing the display panel 210. The display driver integrated circuit 270 may be connected to the display panel 210 through a flexible printed circuit board or a flexible cable. According to an embodiment, the display driver integrated circuit 270 may be disposed in the first frame 221 supporting the display panel 210. According to an embodiment, the display driver integrated circuit 270 may be disposed close to the circuit board 240 to receive a control signal from the circuit board 240. The display driver integrated circuit 270 operatively connected to the circuit board 240 may be disposed in the first frame 221 close to the second frame 223 in which the circuit board 240 is disposed. The display driver integrated circuit 270 may be disposed in the first frame 221 closer to one periphery 222 on which the second frame 223 is formed among peripheries of the first frame 221 than to the other periphery. According to an embodiment, the display device 200 may minimize resistance generated when transmitting and receiving a control signal, and may simplify an arrangement structure for electrical connection through a structure in which the circuit board 240 and the display driver integrated circuit 270 are disposed close to each other.

Figure 5A:
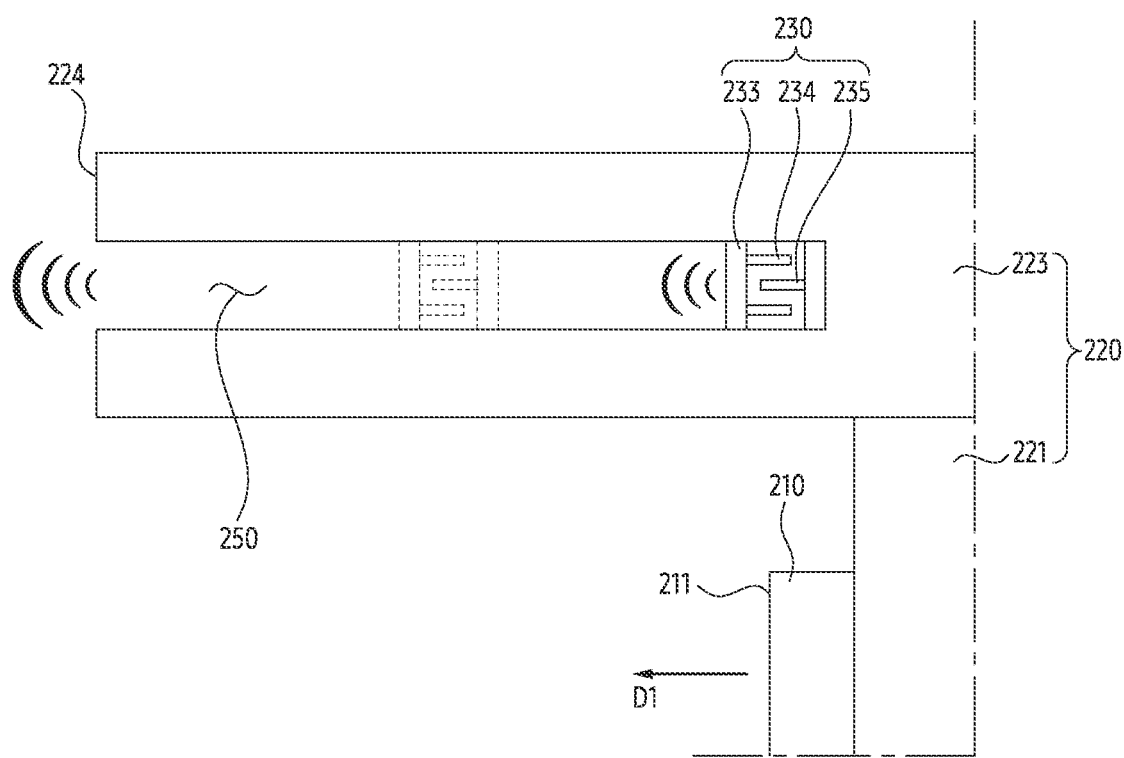
FIG. 5A illustrates an enlarged example of part B of FIG. 4 according to an embodiment.

FIG. 5A illustrates an enlarged example of part B of FIG. 4.

Referring to FIG. 5A, according to an embodiment, the speaker module 230 may include a diaphragm 233 that generates audio by vibrating, a voice coil 234 that provides vibration to the diaphragm 233, and a permanent magnet 235 capable of forming a magnetic field. The permanent magnet 235 may be located between the voice coils 234. According to an embodiment, the speaker module 230 may output audio by generating vibration of the diaphragm 233 when a current flows through the voice coil 234. When the current flows through the voice coil 234, the permanent magnet 235 may form a magnetic field, and the voice coil 234 may also form a magnetic field. The magnetic field by the permanent magnet 235 and the magnetic field by the voice coil 234 attract or repel each other, so that the voice coil 234 may move. In response to the movement of the voice coil 234, the diaphragm 233 may vibrate to output audio.

According to an embodiment, the speaker module 230 may have an arrangement structure for transmitting audio in a direction D1 in which the display area 211 of the display panel 210. The speaker module 230 may be disposed in the slit 250. For example, the speaker module 230 may be disposed at an intermediate point or an end of the slit 250 extending from the front surface 224 of the second frame 223 to the inside of the second frame 223. The audio emission direction of the speaker module 230 may be adjusted through an arrangement structure of the diaphragm 233 and the slit 250. The speaker module 230 may be disposed such that a surface in which the diaphragm 233 faces within the slit 250 faces in the direction D1 in which the display area 211 faces. For example, the speaker module 230 may be disposed in the slit 250 such that the diaphragm 233 faces the front surface 224 of the second frame 223. the speaker module 230 may transmit audio in a direction D1 in which the display area 211 of the display panel 210 faces through the slit 250 by vibration generated from the diaphragm 233.

Figure 5B:
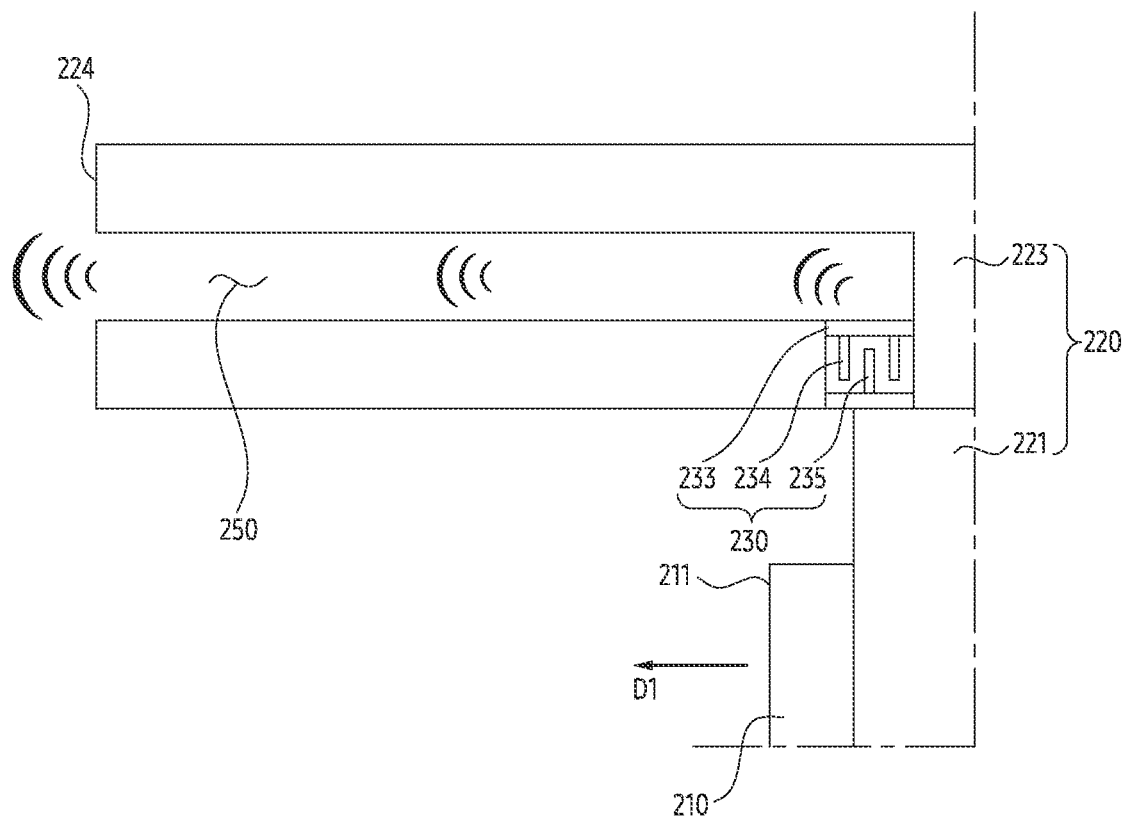
FIG. 5B illustrates another example of an enlarged part B of FIG. 4 according to an embodiment.

FIG. 5B illustrates another example of an enlarged part B of FIG. 4.

Referring to FIG. 5B, the speaker module 230 according to an embodiment may be disposed to be connected to a part of the slit 250. For example, the slit 250 may extend from the front surface 224 of the second frame 223 to the inner surface of the second frame 223. The speaker module 230 may be disposed such that a surface facing the diaphragm 233 is connected to the slit 250. For example, the speaker module 230 may be disposed above or below the slit 250 such that the diaphragm 233 faces the slit 250. The audio emitted from the speaker module 230 may be transmitted in a direction D1 in which the display area 211 of the display panel 210 faces through the slit 250. When a current is applied to the voice coil 234, the diaphragm 233 may vibrate. Since vibration by the diaphragm 233 is transmitted through the slit 250, the speaker module 230 may transmit audio to the outside of the diaphragm 223. Since the slit 250 is formed to face the front surface 224 of the second frame 223, audio emitted from the speaker module 230 may be transmitted in a direction D1 in which the display area 211 faces. The speaker module 230 may transmit audio in a direction D1 in which the display area 211 faces. The speaker module 230 may transmit audio to a user viewing visual information displayed on display area 211. According to an embodiment, the display device 200 may provide high-quality audio to the user by matching the direction of providing visual information and the direction of providing auditory information.

Figure 6:
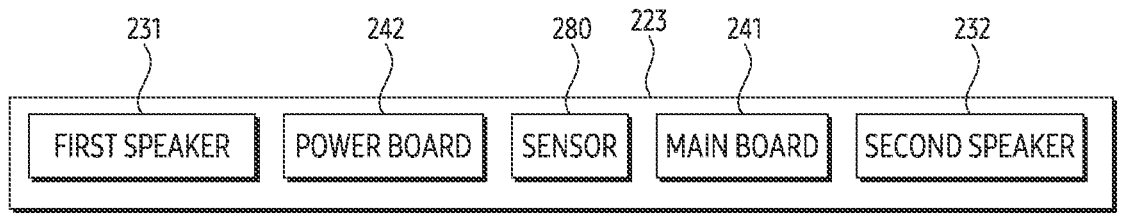
FIG. 6 exemplarily illustrates components included in a second frame of a display device according to an embodiment.

FIG. 6 exemplarily illustrates components included in a second frame of a display device according to an embodiment.

Referring to FIG. 6, according to an embodiment, the second frame 223 of the display device 200 may accommodate the speaker module 230, the circuit board 240, and a sensor 280. According to an embodiment, since the speaker module 230, the circuit board 240, and the sensor 280 are disposed in the second frame 223, the speaker module 230, the circuit board 240, and the sensor 280 may easily maintain electrical connection with each other.

According to an embodiment, the speaker module 230 may include a first speaker 231 and a second speaker 232. The first speaker 231 and the second speaker 232 may be spaced apart from each other in the second frame 223. According to an embodiment, the first speaker 231 may output a first audio signal, and the second speaker 232 may output a second audio signal distinguished from the first audio signal. For example, the first speaker 231 may be disposed at the left side in the second frame 223, output a middle-pitched audio signal and high-pitched audio signal (e.g., 1000 Hz or more), and the second speaker 232 may be disposed at the right side in the second frame 223 and output a low-pitched audio (e.g., 20 Hz to 500 Hz). According to an embodiment, the speaker module 230 may output a stereophonic sound through the first speaker 231 and the second speaker 232. The first speaker 231 and the second speaker 232 are symmetrically disposed at both sides inside the second frame 223, thereby providing a stereophonic sound to a user.

According to an embodiment, the circuit board 240 may include a main board 241 operatively connected to the display panel 210, and a power board 242 for supplying power to the main board 241 and the display panel 210. According to an embodiment, the main board 241 may process an image signal for providing an image signal to the display panel 210, and process an audio signal for providing an audio signal to the speaker module 230. For example, the main board 241 may convert an image signal received from the outside into an image signal that may be provided as visual information through the display panel 210, and may transmit the converted image signal to the display driver integrated circuit (e.g., the display driver integrated circuit 270 of FIG. 4). For example, the main board 241 may convert a digital signal received from the outside into an analog signal that may be provided as audio information through the speaker module 230.

According to an embodiment, the power board 242 may supply power to the main board 241 and the display panel 210. The power board 242 may include power supply circuit elements for supplying power required for driving the display device 200. The power board 242 may include a power connector for inputting external power, and the power connector may be exposed to the outside of the display device 200.

According to an embodiment, the sensor 280 may detect an external object, receive a control command from the external object, or identify an operation of the external object. The sensor 280 may be electrically connected to the main board 241. For example, the sensor 280 may identify the user's operation, and the main board 241 may perform a designated function based on the user's operation identified through the sensor 280. For example, in response to detecting a specific operation of the user from the sensor 280, the main board 241 may perform functions such as turn-on/turn-off, enlargement and reduction of the display area 211, volume adjustment, and channel change.

Figure 7:
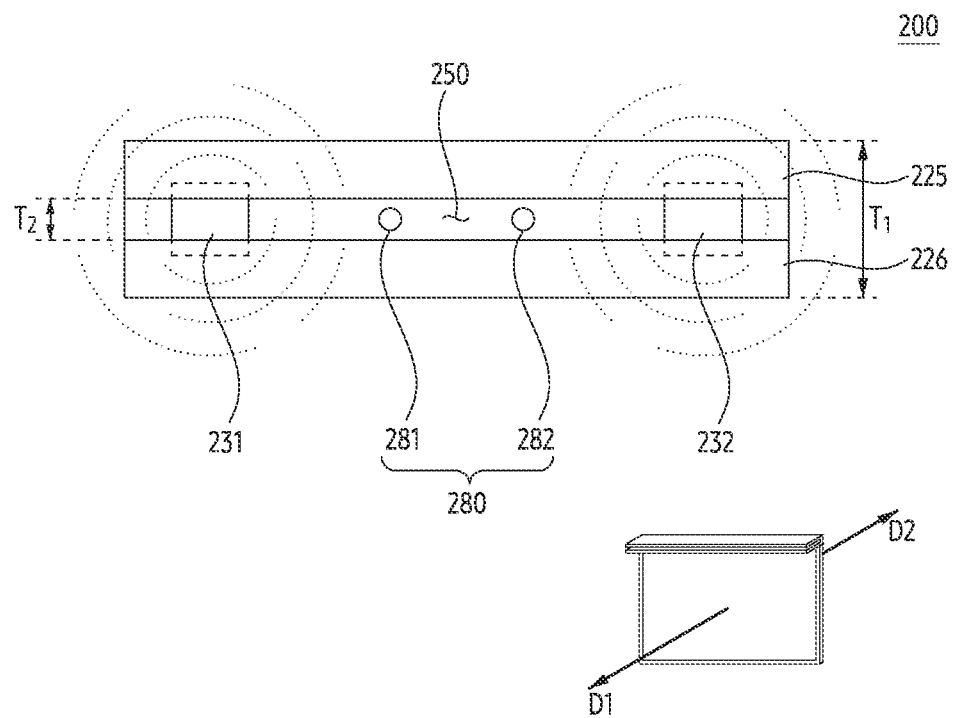
FIG. 7 is a front view of a second frame of a display device according to an embodiment.

FIG. 7 is a front view of a second frame of a display device according to an embodiment.

Referring to FIG. 7, the second frame 223 according to an embodiment may include a slit 250 on the front surface 224 of the second frame 223 facing the direction D1 in which the second frame 223 extends. For example, the slit 250 may extend from the front surface 224 of the second frame 223 toward the inside. For another example, the second frame 223 may include the upper plate 225 and the lower plate 226 disposed on the lower part of the upper plate 225 and spaced apart from the upper plate 225, and may include a slit 250 formed by separation between the upper plate 225 and the lower plate 226.

In the case of the display device having a structure in which the circuit board is disposed on the rear surface of the frame supporting the display panel, since the display panel and the frame for mounting the circuit board is arranged to form the same plane, the thickness of the display device may be increased.

According to an embodiment, the display device 200 may have a thin thickness since the display panel 210 and the circuit board 240 are disposed on different planes. According to an embodiment, the slit 250 may have a thickness sufficient to transmit the vibration of the audio emitted from the speaker module 230. Referring to FIG. 7, a thickness T1 of the second frame 223 may be about 15 mm to about 20 mm, and a thickness T2 of the slit 250 may be about 2 mm to about 6 mm. According to an embodiment, the display panel 210 may be about 10 mm or less. According to an embodiment, since the first frame (e.g., the first frame 221 of FIG. 4) supporting the display panel 210 and the second frame 223 including the circuit board (e.g., the circuit board 240 of FIG. 6) do not form substantially the same plane, a thickness of the first frame 221 in which the display panel 210 is disposed may be thin.

According to an embodiment, the speaker module 230 of the display device 200 may include a first speaker 231 and a second speaker 232 spaced apart from the first speaker 231. For example, the first speaker 231 may be disposed on the left side with respect to the center of the second frame 223, and the second speaker 232 may be disposed on the right side with respect to the center of the second frame 223.

According to an embodiment, the first speaker 231 and the second speaker 232 may output different audio signals. The first speaker 231 may output a first audio signal, and the second speaker 232 may output a second audio signal distinguished from the first audio signal, thereby providing stereophonic sound to a user. Audio emitted from the first speaker 231 and the second speaker 232 may be transmitted to the user through the slit 250. The user may be provided three-dimensional sound through the first speaker 231 and the second speaker 232 that output different audio signals at different locations.

According to an embodiment, the sensor 280 may include at least one of a proximity sensor, an infrared sensor 281, a camera 282, and an ultrasonic sensor. For example, the display device 200 according to an embodiment may include the infrared sensor 281 and the camera 282, and the infrared sensor 281 and the camera 282 may be disposed in the second frame 223. The infrared sensor 281 and the camera 282 may be disposed in the slit 250 and may be exposed to the outside through the slit 250.

According to an embodiment, the sensor 280 may detect light or sound waves from the outside of the display device 200 through the slit 250. For example, the infrared sensor 281 may receive infrared rays emitted from an external electronic device (e.g., a remote control) through the slit 250. For another example, camera 282 may identify a user's operation through slit 250, and display device 200 may perform a function related to a signal related to the identified operation. For another example, the ultrasonic sensor may identify a user's location by emitting a sound wave pulse through the slit 250, measuring a reflected sound wave, and detecting a transmission/reception time interval of the sound wave. According to an embodiment, the display device 200 may adjust the volume of the speaker module 230 or provide a notification based on the location of the user identified through the ultrasonic sensor. For example, when the distance of the user from the display panel 210 is located closer than the threshold value, the display device 200 may provide a warning notification and reduce the volume of the speaker module 230.

Figure 8:
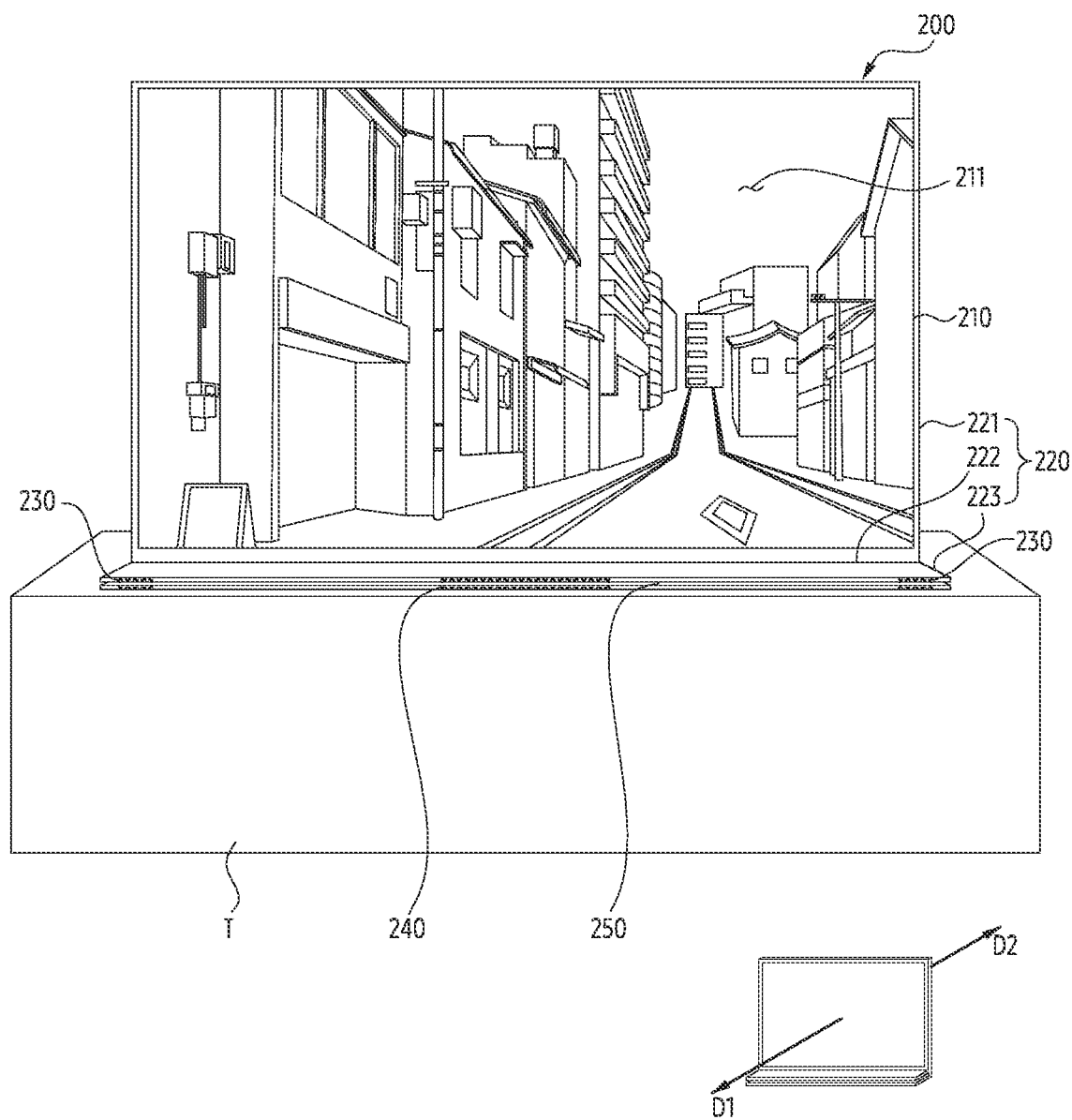
FIG. 8 illustrates a second state of a display device according to an embodiment.

FIG. 8 illustrates a second state of a display device according to an embodiment.

According to an embodiment, the second state of the display device 200 may mean a state in which the second frame 223 is positioned below the first frame 221. The second state may be distinguished from the first state described above. When the display device 200 is in the second state, the display device 200 according to an embodiment may be used as the stand-type display device 200 in which the second frame 223 is disposed on the ground or the table T.

According to an embodiment, the display device 200 may change the posture of the housing 220 according to a situation. According to an embodiment, the display device 200 may be changed from the first state to the second state, and may be changed from the second state to the first state. The display device 200 according to an embodiment may enable appropriate arrangement according to a situation by allowing the posture of change of the housing 220. According to an embodiment, the display device 200 may change the posture of the first state or the second state according to a user's preference and a structure of an indoor space in which the display device 200 is disposed. For example, when placed in a narrow indoor space, the display device 200 may be installed on the wall in a first state to secure an indoor space, and when moved to a large indoor space, the display device 200 may be disposed on the ground or on the table T in a second state.

According to an embodiment, in the first state and the second state, the second frame 223 of the display device 200 may extend in a direction D1 in which the display panel 210 faces. The second frame 223 may support the display device 200 on the ground or on the table T. Since the second frame 223 extends in the direction D1 in which the display area 211 of the display panel 210 faces, the audio emitted from the speaker module 230 disposed in the second frame 223 may be transmitted in a direction D1 in which the display panel 210 faces.

Figure 9:
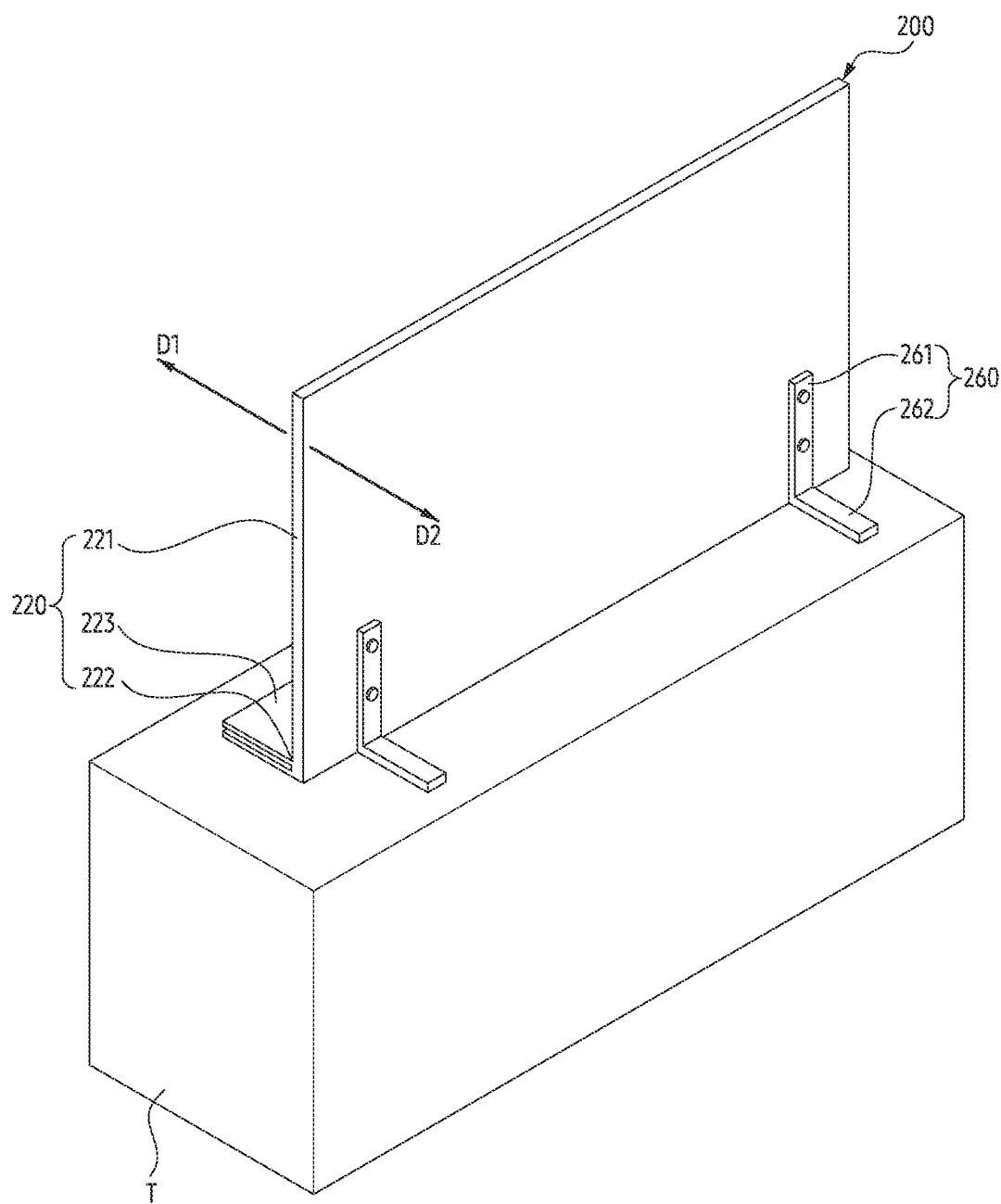
FIG. 9 illustrates a second state of the display device and a support according to an embodiment.

FIG. 9 illustrates a second state of the display device and a support according to an embodiment.

Referring to FIG. 9, the display device 200 according to an embodiment may include a support 260 supporting the housing 220. According to an embodiment, in the second state of the housing 220, the support 260 may include a first body 261 attached to the first frame 221 and a second body 262 that is bent from the first body 261 in a direction D2 opposite to the extending direction D1 of the second frame 223 and supports the housing 220. The second body 262 may be fixed to the housing 220. The second body 262 may locate the display device 200 on the ground or on a table by supporting the housing 220 on the surface facing the surface on which the display panel (e.g., the display panel 210 of FIG. 8) of the housing 220 is disposed.

According to an embodiment, in the second state, the display device 200 may be disposed on an external object. When the display device 200 is in the second state, the second frame 223 of the housing 220 may be located below the first frame 221 and may be in contact with an external object. For example, when the display device 200 is in the second state, the first body 261 of the support 260 may be attached to a surface facing the surface on which the display panel 210 of the housing 220 is disposed and the second body 262 may be in contact with the ground or table T in a direction D2 opposite to the direction D1 facing the second frame 223. The first body 261 may be attached to the housing 220 through an adhesive member, and the second body 262 may be attached to the ground or the table T through the adhesive member.

Figure 10A:
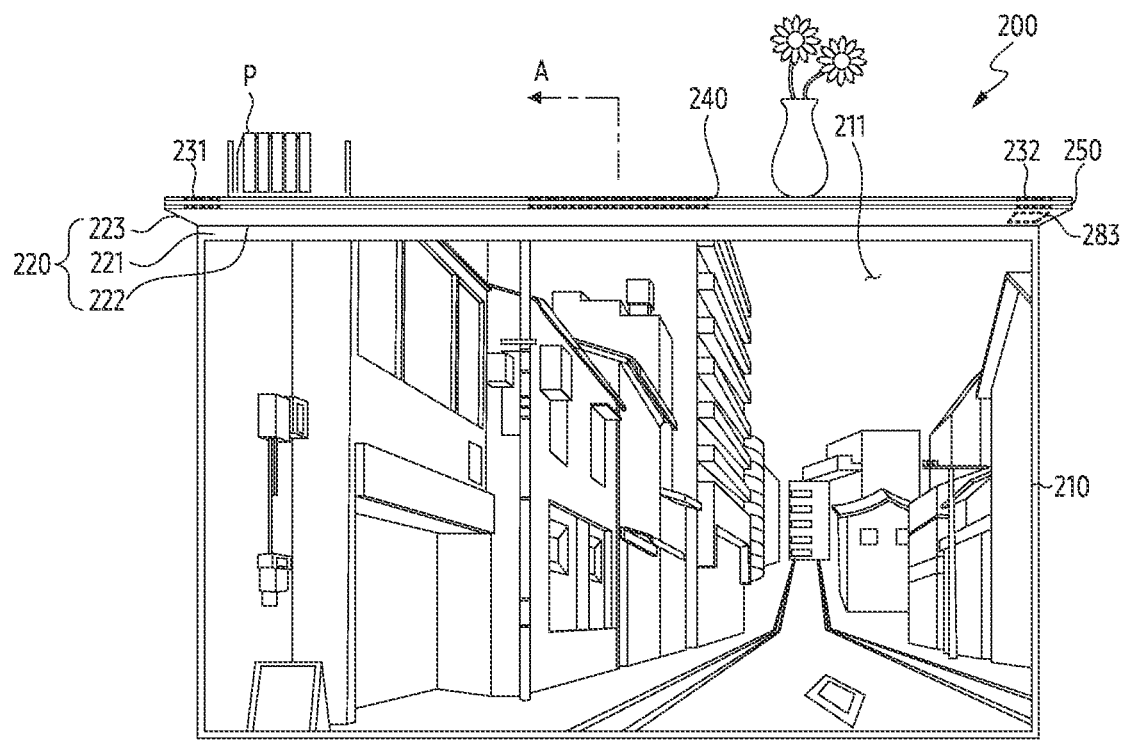
FIGS. 10A, 10B and 10C illustrate a process of converting visual information according to a posture of a display device, according to an embodiment.
Figure 10A:
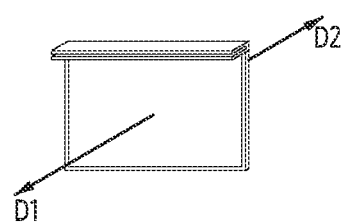
Figure 10B:
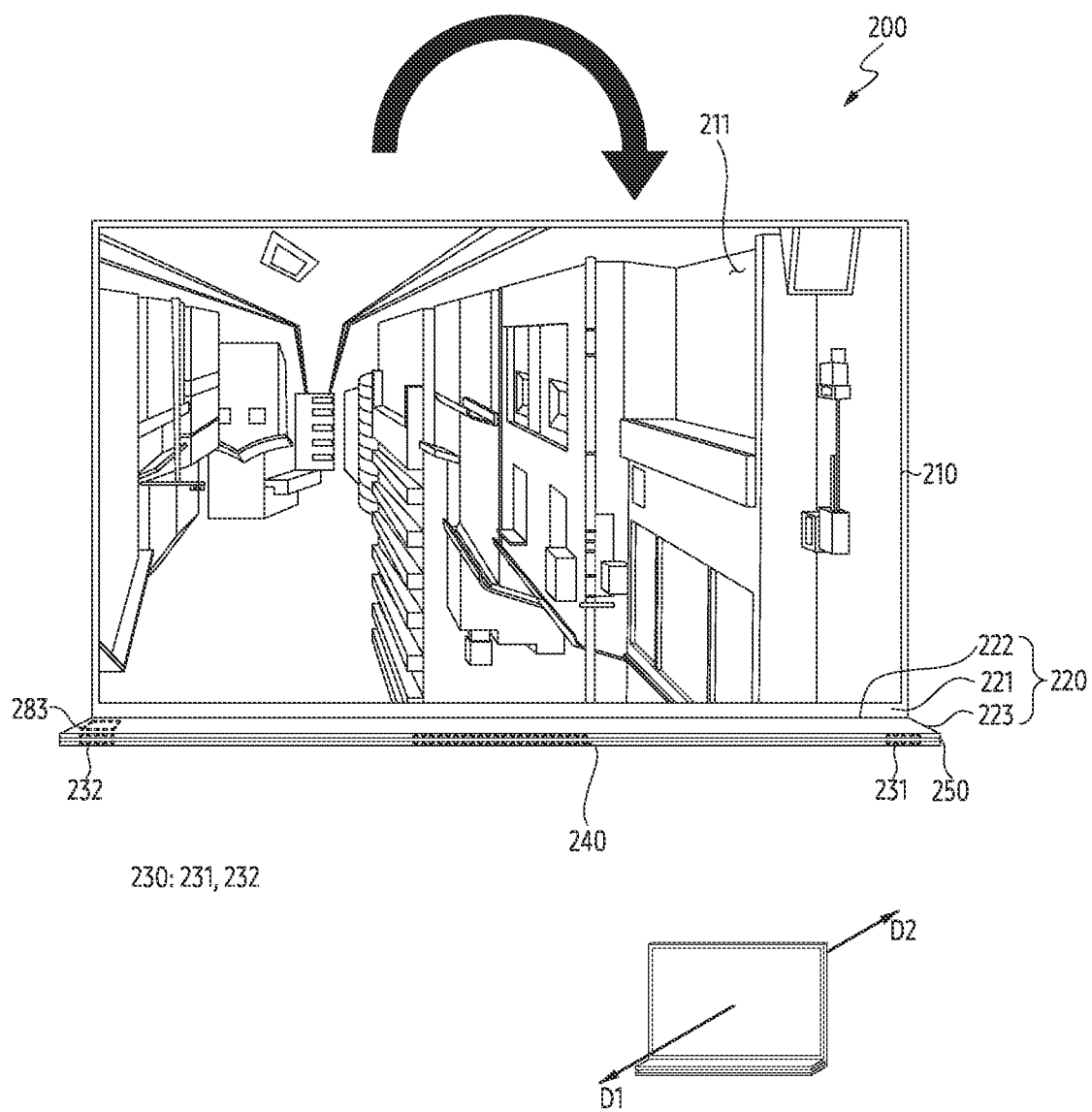
Figure 10C:
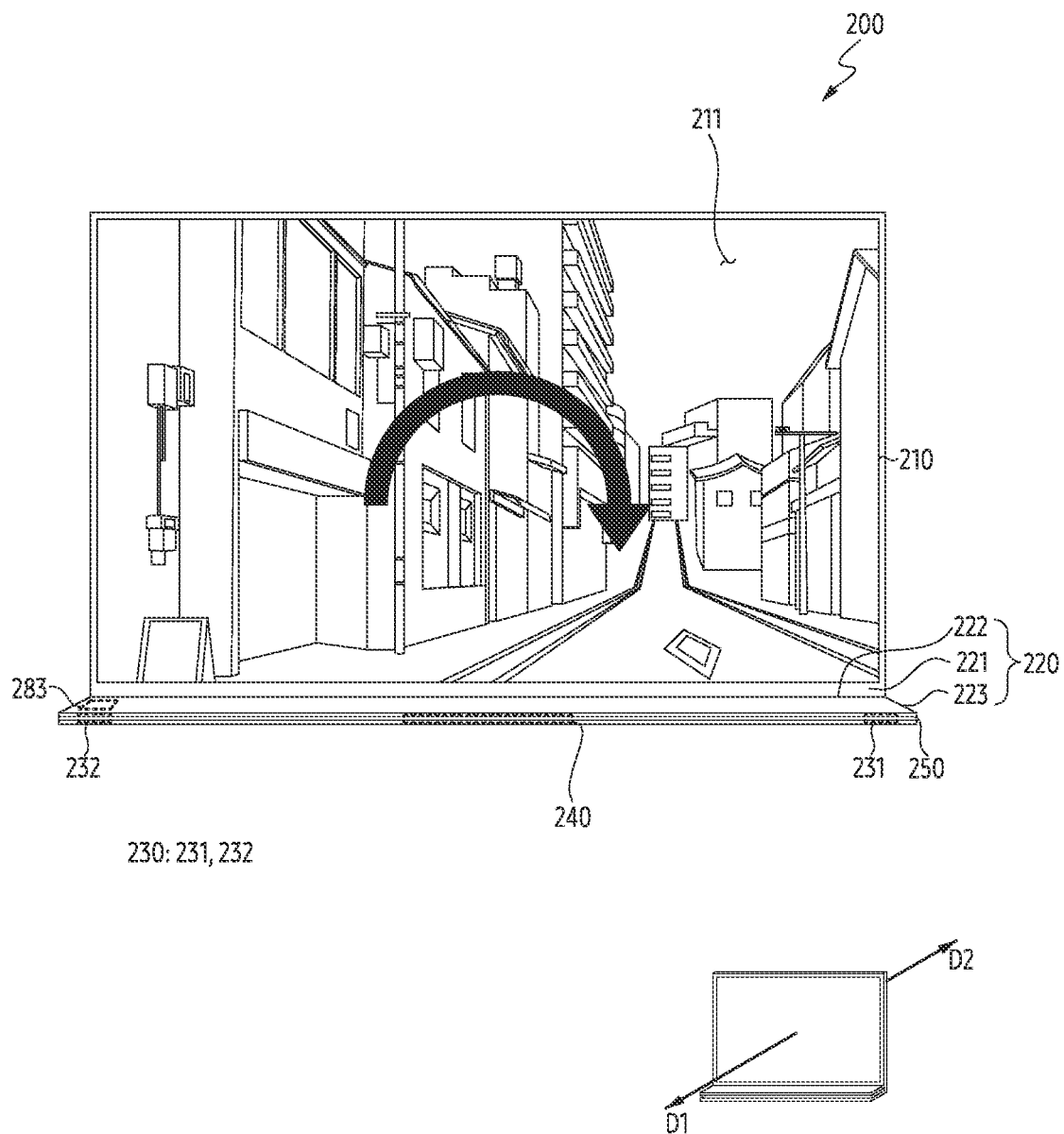

FIGS. 10A to 10C illustrate a process of converting visual information according to a posture of a display device, according to an embodiment.

Referring to FIGS. 10A to 10C, according to an embodiment, when the posture of the housing 220 is changed, the display device 200 may include a posture detection sensor 283 for converting displayed visual information and one or more processors (e.g., the one or more processors 120 of FIG. 1).

According to an embodiment, the posture detection sensor 283 may be disposed in the first frame 221 or the second frame 223. The one or more processors 120 may identify the posture of the housing 220 through the posture detection sensor 283. For example, when the posture of the housing 220 is changed, the posture detection sensor 283 may be a gyro sensor capable of transmitting a signal related to angular velocity to the one or more processors 120 by measuring the Coriolis force. For another example, the posture detection sensor 283 may be a gravity sensor capable of transmitting a signal related to the posture of the housing 220 to the one or more processors 120 by measuring the direction of gravity applied to the display device 200.

According to an embodiment, the one or more processors 120 may be disposed in the second frame 223. The one or more processors 120 may identify the posture change of the housing 220 based on the detection result of the posture detection sensor 283, and may convert visual information provided through the display area 211 in response to the identification. For example, when the posture change is identified through the posture detection sensor 283, the one or more processors 120 may transmit a signal requesting conversion of visual information to the display drier integrated circuit (e.g., the display drier integrated circuit 270 of FIG. 4). When the value measured by the posture detection sensor 283 is less than a threshold value, the one or more processors 120 may identify that the posture of the housing 220 is not changed, and may not generate a signal for controlling the conversion of visual information provided through the display area 211. When the value measured by the posture detection sensor 283 is equal to or greater than a threshold value, the one or more processors 120 may identify that the posture of the housing 220 is changed and generate a signal for controlling the conversion of visual information provided through the display area 211. The one or more processors 120 may transmit a signal for controlling the conversion of the visual information to the display drier integrated circuit 270.

According to an embodiment, FIG. 10A illustrates a display device 200 in which first visual information is displayed in a first state of the housing 220. In the first state, the display device 200 may be installed on an external object such as a wall, a ceiling, or a pillar. According to an embodiment, the one or more processors 120 may provide first visual information through the display area 211 in the first state. The first visual information may mean visual information capable of providing a natural image through the display area 211 in the first state of the housing 220. For example, the first visual information may be content provided through a display area. An upper area of the content of the first visual information may be disposed at one periphery where the second frame 223 of the display panel 210 is located.

According to an embodiment, when the posture of the housing 220 is in the first state, the speaker module 230 may include a first speaker 231 outputting a first audio signal and a second speaker 232 outputting a second audio signal. In the first state of the housing 220, the first speaker 231 may provide audio to the user from the left side with respect to the display panel 210, and the second speaker 232 may provide audio to the user from the right side with respect to the display panel 210.

According to an embodiment, FIG. 10B illustrates a display device 200 in which first visual information is displayed immediately after the housing 220 is changed from the first state to the second state. When the housing 220 is changed from the first state to the second state, the first visual information provided through the display area 211 may be awkward. For example, when the user changes the display device 200 to the second state by rotating the display device 200 180 degrees in the first state, the first visual information provided through the display area 211 may be displayed in an inverted state.

According to an embodiment, FIG. 10C illustrates a display device 200 in which second visual information is displayed in a second state of the housing 220. In the second state, the display device 200 may be disposed on the ground or a table. According to an embodiment, when the housing 220 is changed from the first state to the second state, the posture detection sensor 283 may detect an angular velocity by measuring the Coriolis force. According to an embodiment, when the value measured by the posture detection sensor 283 is equal to or greater than the threshold value, the one or more processors 120 may identify the change from the first state to the second state.

According to an embodiment, in the second state, the one or more processors 120 may provide second visual information through the display area 211. The one or more processors 120 may convert the first visual information into second visual information, in response to identifying the change from the first state to the second state of the housing 220 through the posture detection sensor 283. The second visual information may be substantially the same information as the first visual information. The second visual information may mean visual information capable of providing a natural image through the display area 211 in the second state of the housing 220. The second visual information may be an image obtained by inverting the first visual information right and left and top and bottom. For example, the second visual information may be content provided through the display area. A lower area of the content of the second visual information may be disposed at one periphery where the second frame 223 of the display panel 210 is located.

According to an embodiment, when converting first visual information provided through the display area 211 of the display panel 210 into second visual information, the one or more processors 120 may provide an animation. For example, when converting the first visual information into the second visual information, the one or more processors 120 may provide an animation in which the display area 211 rotates 180 degrees.

According to an embodiment, when the posture of the housing 220 changes from the first state to the second state, the one or more processors 120 may change audio signals output from the first speaker 231 and the second speaker 232. According to an embodiment, when the posture of the housing 220 changes from the first state to the second state, the one or more processors 120 may change the audio signal output through the first speaker 231 from the first audio signal to the second audio signal, and may change the audio signal output through the second speaker 232 from the second audio signal to the first audio signal. In the second state of the housing 220, the first speaker 231 may provide audio to the user from the right side with respect to the display panel 210, and the second speaker 232 may provide audio to the user from the left side with respect to the display panel 210.

According to an embodiment, the display device 200 may allow free arrangement. According to an embodiment, the display device 200 may change the posture of the housing 220 from the first state to the second state or from the second state to the first state. When the posture of the housing 220 is changed, a natural image may be provided to the user through the posture detection sensor 283 and the one or more processors 120. According to an embodiment, the one or more processors 120 may identify the change of posture of the housing 220 through the posture detection sensor 283, and may convert visual information provided through the display area 211 of the display panel 210 in response to the identification.

Figure 11:
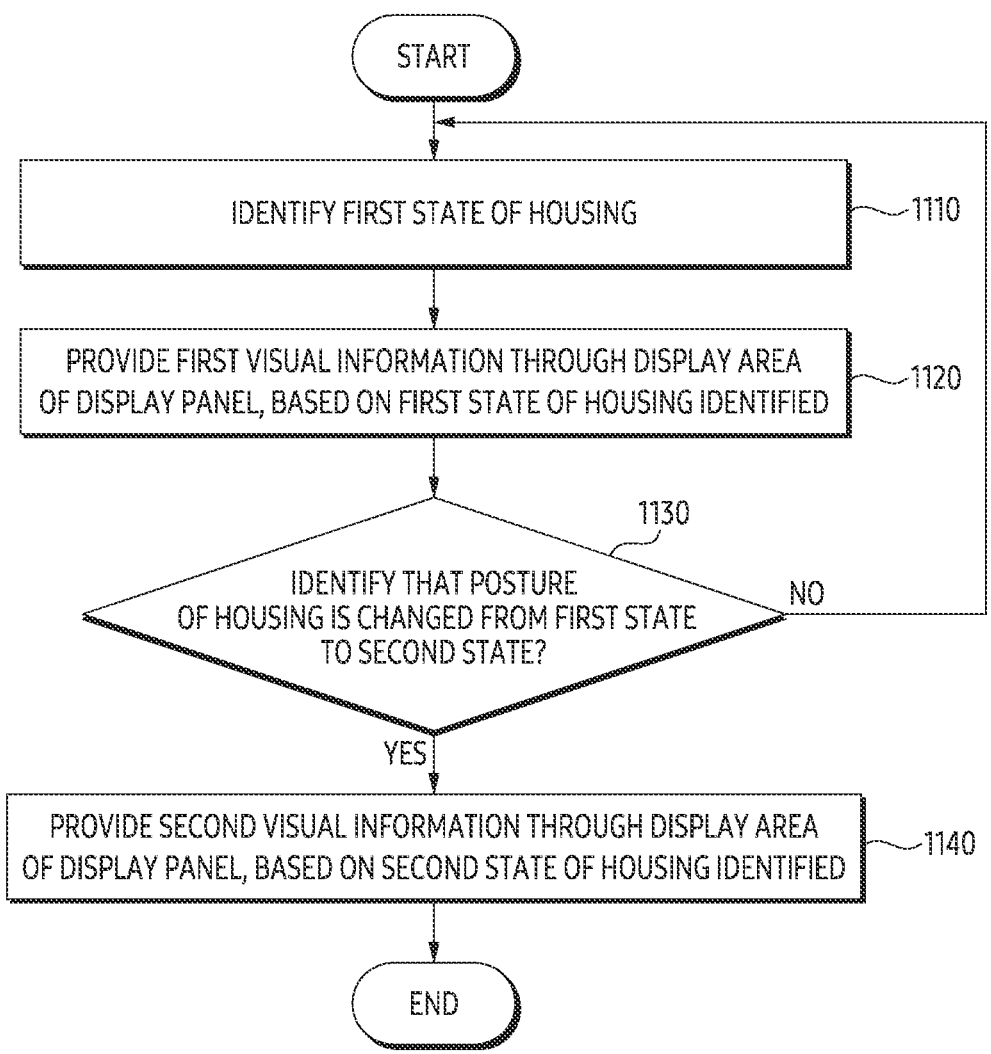
FIG. 11 illustrates an example of an operation of a display device that converts visual information according to a posture of a housing, according to an embodiment.

FIG. 11 illustrates an example of an operation of a display device that converts visual information according to a posture of a housing, according to an embodiment. This operation may be performed by the display device (e.g., the display device 200 of FIG. 2) illustrated in FIG. 2.

Referring to FIG. 11, in operation 1110, the one or more processors (e.g., the one or more processors 120 of FIG. 1) may identify the first state of the housing (e.g., the housing 220 of FIG. 10A) through the posture detection sensor (e.g., the posture detection sensor 283 of FIG. 10A). For example, the first state may be identified by measuring the direction of gravity applied to the display device 200. For another example, the first state may be identified, through the fact that there is no change in the posture of the housing 220 from the final posture of the housing 220.

In operation 1120, The one or more processors (e.g., the one or more processors 120 of FIG. 1) may provide the first visual information through a display area (e.g., the display area 211 of FIG. 10A) of the display panel (e.g., the display panel 210 of FIG. 10A), based on the first state of the housing 220 identified through the posture detection sensor 283. The display area 211 of display panel 210 may provide first visual information to a user. The first visual information may mean visual information capable of providing a natural image through the display area 211 in the first state of the housing 220. For example, the first visual information may be content provided through a display area. An upper area of the content of the first visual information may be disposed at one periphery where the second frame 223 of the display panel 210 is located.

In operation 1130, the one or more processors 120 may identify that the posture of the housing 220 is switched from the first state to the second state through the posture detection sensor 283. For example, when the posture of the housing 220 is changed, the posture detection sensor 283 may measure the angular velocity by measuring the Coriolis force. For another example, the one or more processors 120 may identify the posture change of housing 220 by identifying the direction of gravity applied to housing 220 through posture detection sensor 283. According to an embodiment, when the value measured by the posture detection sensor 283 is less than the threshold value, the one or more processors 120 may identify that the posture of the housing 220 is not changed. When it is identified that the posture of the housing 220 is not changed, the one or more processors 120 may provide the first visual information through the display area 211. According to an embodiment, when the value measured by the posture detection sensor 283 is equal to or greater than a threshold value, the one or more processors 120 may identify that the posture of the housing 220 is changed from the first state to the second state. For example, when the angular velocity value measured by the posture detection sensor 283 is greater than or equal to the threshold value, or the change value in the direction of the measured gravity is greater than or equal to the threshold value, the one or more processors 120 may identify the change of posture of housing 220.

In operation 1140, the one or more processors 120 may provide the second visual information through the display area 211 of the display panel 210 based on the second state of the housing 220 identified through the posture detection sensor 283. The display area 211 of display panel 210 may provide second visual information to a user. In the second state of the housing 220, the second visual information may mean visual information capable of providing a natural image through the display area 211. The second visual information may be an image obtained by inverting the first visual information right and left and top and bottom. For example, the second visual information may be content provided through a display area. A lower area of the content of the second visual information may be disposed at one periphery where the second frame 223 of the display panel 210 is located.

According to the above-described embodiment, the display device 200 may identify the posture change of the housing 220 and convert visual information provided through the display area 211 of the display panel 210 based on the posture of the housing 220. The user may freely switch the arrangement state of the display device 200 and may be provided natural visual information according to the change of the arrangement state. In the above-described operation of the display device 200, the first state and the second state may be mutually changed. For example, the display device 200 may perform the same operation when switching from the second state of the housing 220 to the first state.

Figure 12:
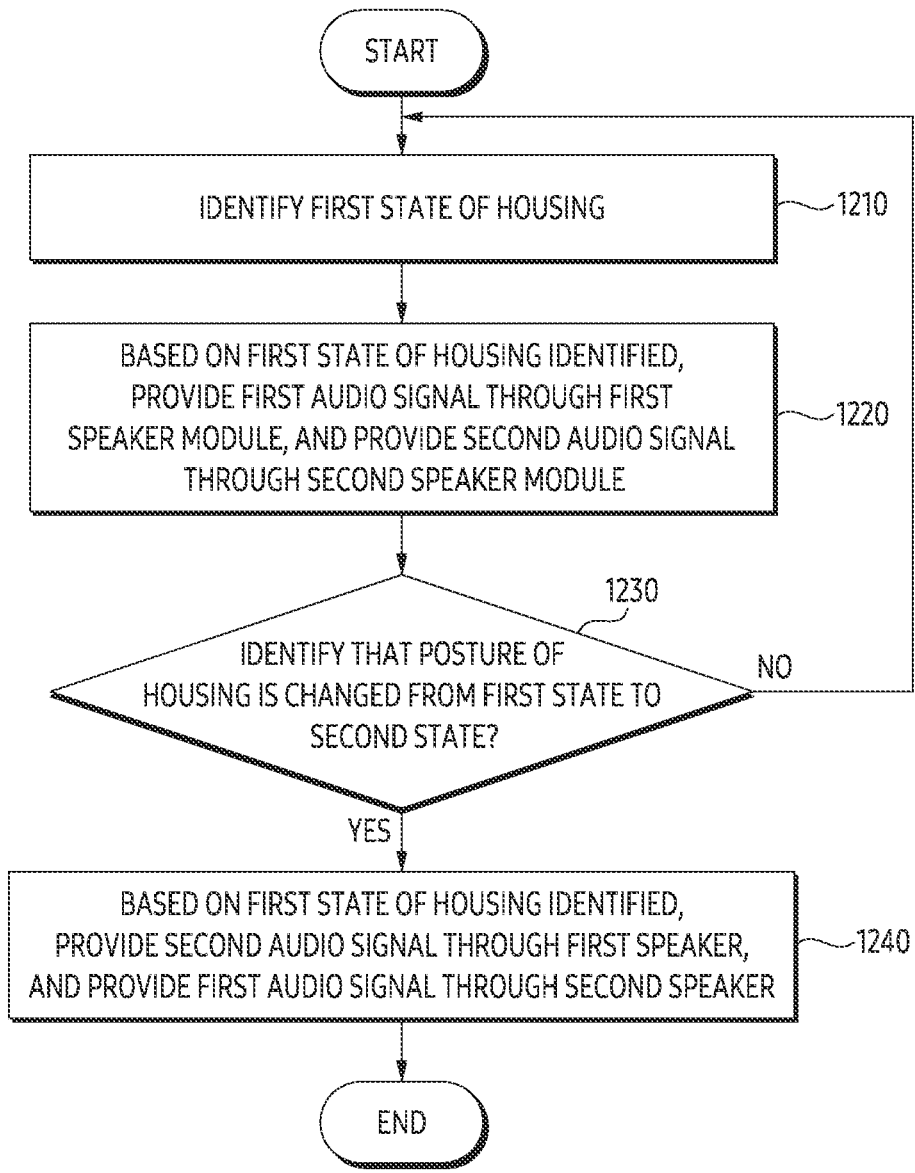
FIG. 12 illustrates an example of an operation of a display device that converts an audio signal according to a posture of a housing, according to an embodiment.

FIG. 12 illustrates an example of an operation of a display device that converts an audio signal according to a posture of a housing, according to an embodiment. This operation may be performed by the display device (e.g., the display device 200 of FIG. 2) illustrated in FIG. 2.

According to an embodiment, the speaker module (e.g., the speaker module 230 of FIG. 6) may include a first speaker (e.g., a first speaker 231 of FIG. 6) and a second speaker (e.g., a second speaker 232 of FIG. 6) spaced apart from each other in a second frame (e.g., the second frame 223 of FIG. 2) and outputting different audio signals. According to an embodiment, the speaker module 230 may provide stereophonic sound to a user using the display device 200 through the first speaker 231 and the second speaker 232. For example, the one or more processors (e.g., the one or more processors 120 of FIG. 1) may control the audio signals of different channels to be output through the first speaker 231 and the second speaker 232 by allocating audio signals of different channels to the first speaker 231 and the second speaker 232. The speaker module 230 may output different sounds according to the sound range band of the audio signal. For example, the one or more processors 120 may control to provide a high-pitched audio signal and a middle-pitched sound (e.g., 1000 Hz or higher) through the first speaker 231 and control to provide a low-pitched audio (e.g., 20 Hz to 500 Hz) through the second speaker 232. The user may be provided stereophonic and rich sound through the first speaker 231 and the second speaker 232 that emit audio of different frequencies.

According to an embodiment, according to the posture of the housing (e.g., the housing 220 of FIG. 10A), the audio emitted through the speaker module 230 may be changed left and right. For example, when the housing 220 is in the first state, the first speaker 231 may be disposed on the left side respect to the display panel 210, and the second speaker 232 may be disposed on the right side respect to the display panel 210. When the posture of the housing 220 is changed from the first state to the second state, the arrangement structure of the first speaker 231 and the second speaker 232 may be changed. When the posture of the housing 220 is changed, the first speaker 231 may be disposed on the right side with respect to the display panel 210, and the second speaker 232 may be disposed on the left side with respect to the display panel 210. Since the arrangement structure of the first speaker 231 and the second speaker 232 is changed by the posture change of the housing 220, the quality of sound provided to the user may be distorted.

According to an embodiment, the one or more processors 120 may control an audio signal output through the first speaker 231 and the second speaker 232 based on the posture of the housing 220. When the posture of the housing 220 is changed, the one or more processors 120 may control the audio channel allocated to the first speaker 231 and the second speaker 232 to provide substantially the same audio through the speaker module 230 regardless of the switching.

Referring to FIG. 12, in operation 1210, the posture detection sensor (e.g., the posture detection sensor 283 of FIG. 10A) may identify the first state of the housing 220. For example, the first state may be identified, through the fact that there is no change in the posture of the housing 220 from the final posture of the housing 220.

In operation 1220, the one or more processors 120 may provide an audio signal through the speaker module 230 based on the first state of the housing 220 identified through the posture detection sensor 283. For example, in the first state of the housing 220 illustrated in FIG. 10A, the one or more processors 120 may provide a first audio signal through the first speaker 231 and a second audio signal through the second speaker 232.

In operation 1230, the one or more processors 120 may identify that the posture of the housing 220 is changed from the first state to the second state through the posture detection sensor 283. According to an embodiment, the posture detection sensor 283 may measure the angular velocity by measuring the Coriolis force when the posture of the housing 220 is changed. According to an embodiment, when the value measured by the posture detection sensor 283 is less than the threshold value, the one or more processors 120 may identify that the posture of the housing 220 is not changed. According to an embodiment, when the value measured by the posture detection sensor 283 is equal to or greater than a threshold value, the one or more processors 120 may identify that the posture of the housing 220 is changed from the first state to the second state. When the value measured by the posture detection sensor 283 is less than the threshold value, the one or more processors 120 may identify that the posture of the housing 220 is not changed, and may continue to provide a first audio signal through the first speaker 231 and a second audio signal through the second speaker 232.

In operation 1240, the one or more processors 120 may provide an audio signal through the speaker module 230 based on the second state of the housing 220 identified through the posture detection sensor 283. According to an embodiment, when the posture of the housing 220 changes from the first state to the second state, the one or more processors 120 may change audio signals output from the first speaker 231 and the second speaker 232. For example, in the second state of the housing 220 illustrated in FIG. 10C, the one or more processors 120 may provide a second audio signal through the first speaker 231 and a first audio signal through the second speaker 232. According to an embodiment, the display device 200 may provide substantially the same audio signal to the user regardless of the posture change of the housing 220.

According to the above-described embodiment, the display device 200 may identify the posture change of the housing 220 and may convert an audio signal provided through the speaker module 230 based on the posture change of the housing 220. The user may freely change the arrangement state of the display device 200 and may be provided substantially the same sound regardless of the change of the arrangement state. In the above-described operation of the display device 200, the first state and the second state may be mutually changed. For example, the display device 200 may perform the same operation when switching from the second state of the housing 220 to the first state.

According to an embodiment, a display device (e.g., display device 200 of FIG. 2) may comprise a display panel (e.g., display panel 210 of FIG. 2); a housing (e.g., housing 220 of FIG. 2) comprising a first frame (e.g., first frame 221 of FIG. 2) comprising a plate supporting one surface of the display panel and a second frame (e.g., second frame 223 of FIG. 2) integrally formed with the first frame, and extending from one periphery (e.g., one periphery 222 of FIG. 2) of the first frame in a direction toward which the display area (e.g., display area 211 of FIG. 2) of the display panel faces; a speaker module (e.g., speaker module 230 of FIG. 2) disposed in the second frame; and a circuit board (e.g., circuit board 240 of FIG. 2) disposed in the second frame and operatively connected to the display panel and the speaker module; wherein the second frame may comprise a slit (e.g., slit 250 of FIG. 2) disposed on an outer surface of the second frame facing a direction in which the second frame extends to transmit audio emitted from the speaker module in a direction toward which the display area faces.

According to an embodiment, the display device may further comprise a display driver integrated circuitry (DDI) (e.g., the display drier integrated circuit 270 of FIG. 4) disposed closer to the one periphery among peripheries of the first frame than another periphery on which the second frame is formed and operatively connected to the circuit board.

According to an embodiment, the slit may extend from a surface facing a diaphragm (e.g., diaphragm 233 of FIG. 5A) of the speaker module to the outer surface of the second frame.

According to an embodiment, the diaphragm of the speaker module may be disposed in a direction in which the display area of the display panel faces.

According to an embodiment, the circuit board may further comprise a main board (e.g., main board 241 of FIG. 6) operatively connected to the display panel; and a power board (e.g., power board 242 of FIG. 6) in the second frame supplying power to the main board and the display panel.

According to an embodiment, the speaker module may comprise a first speaker (e.g., first speaker 231 of FIG. 6) outputting a first audio signal and a second speaker (e.g., second speaker 232 of FIG. 6) spaced apart from the first speaker within the second frame and outputting a second audio signal.

According to an embodiment, the display device may further comprise a sensor (e.g., the sensor 280 in FIG. 6) disposed within the second frame, and wherein the sensor may comprise an infrared sensor or a camera.

According to an embodiment, the sensor may be exposed to the outside of the display device through the slit and may detect light or sound waves from the outside of the display device through the slit.

According to an embodiment, a thickness of the second frame (e.g., thickness T1 in FIG. 7) may be 15 mm to 2 mm and a thickness (e.g., thickness T2 of FIG. 7) of the slit may be 2 mm to 5 mm.

According to an embodiment, the extending direction of the second frame may be perpendicular to the first frame.

According to an embodiment, a display device may comprise a display panel; a housing comprising a first frame comprising a plate supporting one surface of the display panel and a second frame integrally formed with the first frame, and extending from one periphery of the first frame in a direction toward which the display area of the display panel faces; a speaker module disposed in the second frame; a posture detection sensor (e.g., posture detection sensor 283 of FIG. 10A) within the housing that identifies a posture of the housing; and one or more processors (e.g., the one or more processors 120 of FIG. 1) within the second frame that converts visual information provided through the display area based on a signal obtained from the posture detection sensor.

According to an embodiment, the posture of the housing may be changeable to a first state in which the second frame is positioned above the first frame or a second state in which the second frame is positioned below the first frame.

According to an embodiment, the one or more processors may be configured to provide first visual information through the display area in the first state; identify that the housing is changed from the first state to the second state through the posture detection sensor; and change the first visual information to the second visual information to provide substantially same information as the first visual information through the display area, in response to the identification, according to a change in the posture of the housing.

According to an embodiment, the display device may further comprise a support (e.g., support 260 of FIG. 3) comprising a first body (e.g., first body 261 of FIG. 3) attached to the first frame and fixed to an external object and a second body (e.g., second body 262 of FIG. 3) extending from the first body along the second frame, when the housing is in the first state.

According to an embodiment, the display device may further comprise a support (e.g., support 260 of FIG. 9) comprising a first body (e.g., first body 261 of FIG. 9) attached to the first frame and a second body (e.g., second body 262 of FIG. 9) bent from the first body in a direction opposite to extending direction of the second frame and supporting the housing.

According to an embodiment, the speaker module may comprise a first speaker and a second speaker spaced apart from the first speaker within the second frame, wherein the one or more processors may be configured to provide a first audio signal through the first speaker and a second audio signal through the second speaker in the first state; identify that the housing is changed from the first state to the second state through the posture detection sensor; and provide the second audio signal through the first speaker and provide the first audio signal through the second speaker, in response to the identification, according to a change in the posture of the housing.

According to an embodiment, the second frame may comprise a slit disposed on an outer surface of the second frame toward the extending direction of the second frame to transmit the audio emitted from the speaker module in a direction toward which the display area faces.

According to an embodiment, the slit may extend from a surface facing a diaphragm of the speaker module to the outer surface of the second frame.

According to an embodiment, the display device may further comprise a circuit board disposed in the second frame and operatively connected to the display panel and the speaker module; and a display driver integrated circuitry (DDI) disposed closer to the one periphery among peripheries of the first frame than another periphery on which the second frame is formed and operatively connected to the circuit board.

According to an embodiment, the display device may further comprise a sensor disposed within the second frame, wherein the sensor may comprise infrared a sensor or a camera.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., program) including one or more instructions that are stored in a storage medium (e.g., internal memory or external memory) that is readable by a machine (e.g., display device). For example, one or more processors of the machine (e.g., display device) may invoke at least one of the one or more instructions stored in the storage medium, and execute it, with or without using one or more other components under the control of the one or more processors. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A display device comprising:
a display panel including a display area;
a housing including:
a first frame portion supporting the display panel, and
a second frame portion extending from a front periphery of the first frame portion of the housing in a direction of the display area of the display panel, defining a slit;
a speaker module, including at least one speaker, disposed in the second frame portion of the housing from among the first frame portion and the second frame portion, and arranged with respect to the slit; and
a circuit board, disposed in the second frame portion of the housing from among the first frame portion and the second frame portion, configured to generate an image to be displayed via the display panel,
wherein the slit is used as a transmission path of an audio signal output from the at least one speaker.

2. The display device of claim 1, further comprising:
a display driver integrated circuitry (DDI) disposed closer to the front periphery among peripheries of the first frame portion from which the second frame portion is formed to extend and operatively be connected to the circuit board than another periphery among peripheries of the first frame portion.

3. The display device of claim 1,
wherein the slit extends from an outer surface of the second frame portion to an inside of the second frame portion in which the speaker module is disposed.

4. The display device of claim 3,
wherein the speaker module is disposed in the slit such that a diaphragm of the speaker module faces the outer surface of the second frame portion.

5. The display device of claim 1, wherein the circuit board further comprises:
a main board in the second frame portion operatively connected to the display panel; and
a power board in the second frame portion to supply power to the main board and the display panel.

6. The display device of claim 1,
wherein the speaker module includes:
a first speaker to output a first audio signal, and a second speaker, spaced apart from the first speaker in the second frame portion, to output a second audio signal.

7. The display device of claim 1, further comprising:
a sensor disposed in the second frame portion,
wherein the sensor comprises an infrared sensor, a camera, or an ultrasonic sensor.

8. The display device of claim 7,
wherein the sensor is exposed to an outside of the display device through the slit and detects light or sound waves from the outside of the display device through the slit.

9. The display device of claim 1,
wherein a thickness of the second frame portion is 15 mm to 20 mm and a thickness of the slit is 2 mm to 5 mm.

10. The display device of claim 1,
wherein the second frame portion is perpendicular to the first frame portion.

11. A display device comprising:
a display panel including a display area;
a housing including:
 a first frame portion supporting the display panel, and
 a second frame portion, extending from a front periphery of the first frame portion of the housing in a direction of the display area of the display panel;
a speaker module, including at least one speaker, disposed in the second frame portion of the housing from among the first frame portion and the second frame portion;
a posture detection sensor configured to identify a posture of the housing;
one or more processors, disposed in the second frame portion of the housing from among the first frame portion and the second frame portion, configured to change visual information provided through the display area of the display panel based on the posture of the housing identified by the posture detection sensor; and
a circuit board, disposed in the second frame portion of the housing from among the first frame portion and the second frame portion, configured to generate an image to be displayed via the display panel.

12. The display device of claim 11,
wherein the posture of the housing is changeable to a first state in which the second frame portion is positioned above the first frame portion or a second state in which the second frame portion is positioned below the first frame portion.

13. The display device of claim 12, wherein the one or more processors is configured to:
provide first visual information through the display area while the posture of the housing is in the first state;
identify that the posture of the housing is changed from the first state to the second state through the posture detection sensor; and
change the first visual information to second visual information to provide substantially same information as the first visual information through the display area, according to the posture of the housing being identified as changed.

14. The display device of claim 12, further comprising:
a support including:
 a first body attachable to the first frame portion and to be fixed to an external object, and
 a second body, extending from the first body of the support along the second frame portion, while the housing is in the first state.

15. The display device of claim 12, further comprising:
a support including:
a first body attachable to the first frame portion, and
a second body bent from the first body of the support in a direction opposite to the direction of the display area of the display panel, wherein the support supports the housing.

16. The display device of claim 12,
wherein the speaker module corresponds to a first speaker,
wherein the display device further comprises a second speaker, spaced apart from the first speaker, disposed in the second frame portion from among the first frame portion and the second frame portion, and
wherein the one or more processors is configured to:
 provide a first audio signal through the first speaker and a second audio signal through the second speaker while the posture of the housing is in the first state;
 identify that the posture of the housing is changed from the first state to the second state through the posture detection sensor; and
 provide the second audio signal through the first speaker and provide the first audio signal through the second speaker, according to the posture of the housing being identified as changed.

17. The display device of claim 11,
wherein the second frame portion includes a slit on an outer surface of the second frame portion toward the direction in which the second frame portion is formed to extend to allow audio emitted from the speaker module to be transmitted along the direction toward which the display area faces.

18. The display device of claim 17,
wherein the slit extends from an outer surface of the second frame portion to an inside of the second frame portion in which the speaker module is disposed.

19. The display device of claim 11, further comprising:
a display driver integrated circuitry (DDI) disposed closer to the front periphery among peripheries of the first frame portion from which the second frame portion is formed to extend and operatively be connected to the circuit board than another periphery among peripheries of the first frame portion.

20. The display device of claim 11, further comprising:
a sensor disposed within the second frame portion, wherein the sensor comprises an infrared sensor, a camera or an ultrasonic sensor.

* * * * *